United States Patent
Woods

(10) Patent No.: US 9,815,573 B2
(45) Date of Patent: Nov. 14, 2017

(54) SOLAR ENERGY CONVERSION AND TRANSMISSION SYSTEM AND METHOD

(71) Applicant: James Joshua Woods, Normal, IL (US)

(72) Inventor: James Joshua Woods, Normal, IL (US)

(*) Notice: Subject to any disclaimer, the term of this patent is extended or adjusted under 35 U.S.C. 154(b) by 253 days.

(21) Appl. No.: 14/840,433

(22) Filed: Aug. 31, 2015

(65) Prior Publication Data

US 2016/0065006 A1    Mar. 3, 2016

Related U.S. Application Data

(60) Provisional application No. 62/044,360, filed on Sep. 1, 2014.

(51) Int. Cl.
*B64G 1/00*    (2006.01)
*H02J 17/00*   (2006.01)
(Continued)

(52) U.S. Cl.
CPC .......... *B64G 1/007* (2013.01); *B64G 1/1085* (2013.01); *B64G 1/428* (2013.01); *B64G 1/44* (2013.01);
(Continued)

(58) Field of Classification Search
CPC ...... B64G 1/007; B64G 1/1085; B64G 1/428; B64G 1/44; B64G 1/64; B64G 1/66; B64G 1/002; B64G 1/242; B64G 1/283; B64G 1/288; B64G 1/36; B64G 1/361; B64G 1/363; B64G 1/365; B64G 1/366; B64G 2001/1092; H02J 17/00
(Continued)

(56) References Cited

U.S. PATENT DOCUMENTS 3,521,835 A * 7/1970 Braga-Illa ............... B64G 1/242
                                                244/171
3,781,647 A * 12/1973 Glaser .................... B64G 1/428
                                                136/245
(Continued)

OTHER PUBLICATIONS

Aruvian, Analyzing Microwave Power Transmission & Solar Power Satellite Systems, Abstract and Index from Research and Markets, Date Unknown, Pages Unknown, Publisher Unknown, Place of Publication Unknown.
(Continued)

*Primary Examiner* — Brandon S Cole
(74) *Attorney, Agent, or Firm* — Robin S. Fahlberg

(57) ABSTRACT

A modular satellite for converting solar energy to microwave energy and transmitting the microwave energy to the earth to be converted into electricity includes solar panels configured to convert solar energy into direct current; a magnetron operatively connected to the solar panels to receive the direct current and configured to convert the direct current into microwave energy; a planar wave guide antenna operatively connected to the magnetron to receive the microwave energy and direct the microwave energy to a station on earth; and a coupling system for coupling with another satellite to form an array in response to at least one of locking, unlocking, and navigational commands. The satellite has a mass equal to or less than four kilograms, and a volume equal to or less than three liters.

19 Claims, 32 Drawing Sheets

(51) Int. Cl.
  *B64G 1/10* (2006.01)
  *B64G 1/42* (2006.01)
  *B64G 1/44* (2006.01)
  *B64G 1/64* (2006.01)
  *B64G 1/66* (2006.01)
  B64G 1/24 (2006.01)
  B64G 1/28 (2006.01)
  B64G 1/36 (2006.01)

(52) U.S. Cl.
  CPC ............... *B64G 1/64* (2013.01); *B64G 1/66* (2013.01); *H02J 17/00* (2013.01); *B64G 1/002* (2013.01); *B64G 1/242* (2013.01); *B64G 1/283* (2013.01); *B64G 1/288* (2013.01); *B64G 1/36* (2013.01); *B64G 1/361* (2013.01); *B64G 1/363* (2013.01); *B64G 1/365* (2013.01); *B64G 1/366* (2013.01); *B64G 2001/1092* (2013.01)

(58) Field of Classification Search
  USPC .................................................. 307/43–87
  See application file for complete search history.

(56) References Cited

U.S. PATENT DOCUMENTS

| | | | |
|---|---|---|---|
| 6,936,760 B2 | 8/2005 | Rogers et al. | |
| 7,077,361 B1 | 7/2006 | Rabinowitz | |
| 7,612,284 B2 | 11/2009 | Rogers et al. | |
| 7,888,586 B2* | 2/2011 | Yamamoto | B64G 1/428 136/244 |
| 7,997,532 B2 | 8/2011 | Tillotson | |
| 8,653,784 B2 | 2/2014 | Bland | |
| 8,785,840 B2* | 7/2014 | Schulte | A01G 15/00 250/251 |
| 2001/0035207 A1 | 11/2001 | Mikami et al. | |
| 2007/0238252 A1* | 10/2007 | Eastlund | A01G 15/00 438/282 |
| 2008/0000232 A1 | 1/2008 | Rogers et al. | |
| 2010/0269143 A1* | 10/2010 | Rabowsky | H04B 7/18591 725/63 |
| 2010/0276547 A1 | 11/2010 | Rubenchik et al. | |
| 2013/0032673 A1* | 2/2013 | Kobayashi | B64G 1/44 244/158.4 |
| 2013/0099599 A1 | 4/2013 | Jaffe et al. | |
| 2016/0065006 A1* | 3/2016 | Woods | B64G 1/64 307/84 |

OTHER PUBLICATIONS

Daniel Wood, Space-Based Solar Power, Energy.gov website, Mar. 6, 2014 (downloaded from http://energy.gov/articles/space-based-solar-power on Jan. 26, 2015).

Susumu Sasaki, How Japan Plans to Build an Orbital Solar Farm, Apr. 24, 2014 (downloaded from http://spectrum.ieee.org/green-tech/solar/how-japan-plans-to-build-an-orbital-solar-farm on Jan. 26, 2015).

Giovanni Andrea Casula, Giuseppe Mazzarella, Giorgio Montisci, Jan. 21, 2013, Design of Shaped Beam Planar Arrays of Waveguide Longitudinal Slots, International Journal of Antennas and Propagation, vol. 2013, Article ID 767342.

* cited by examiner

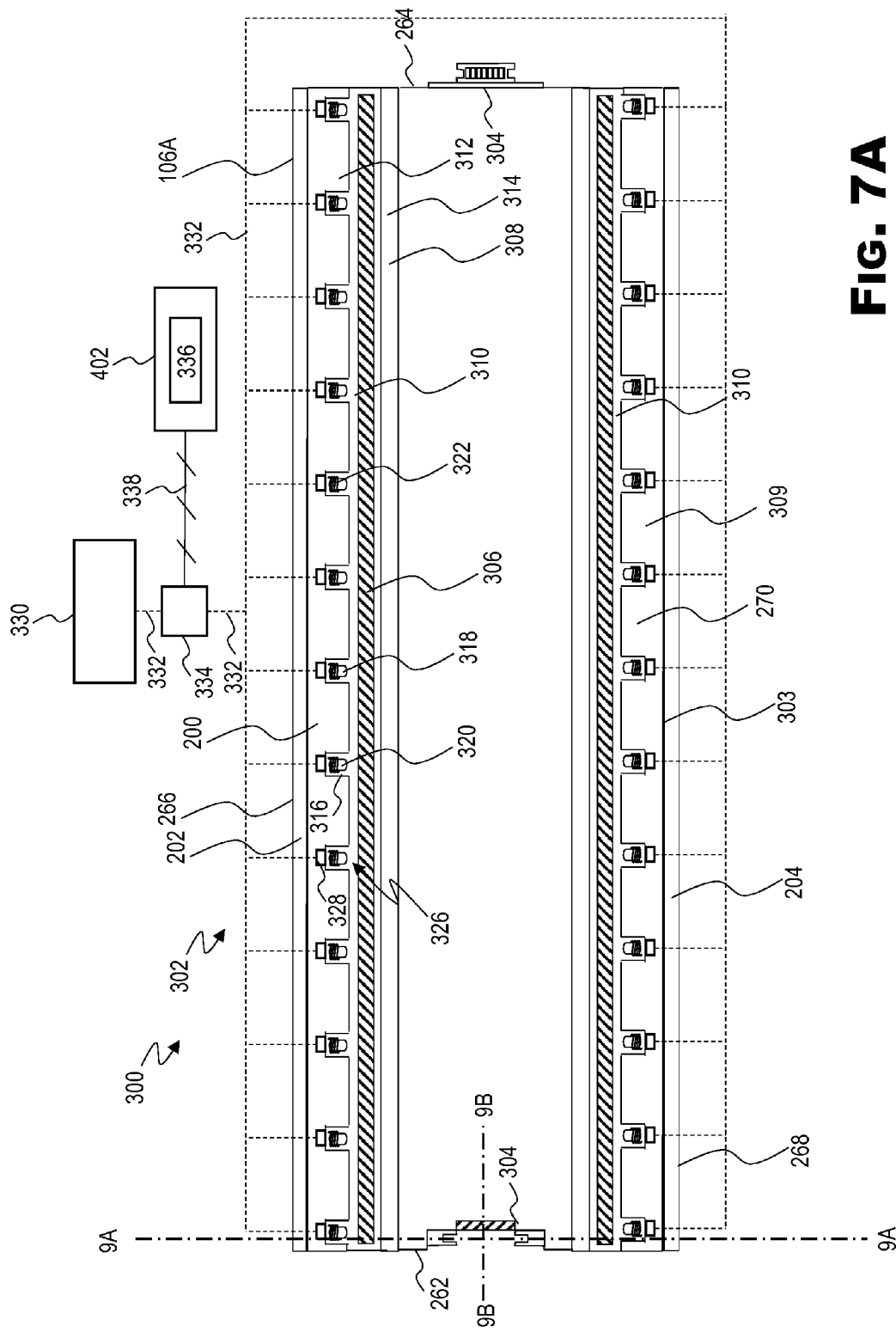

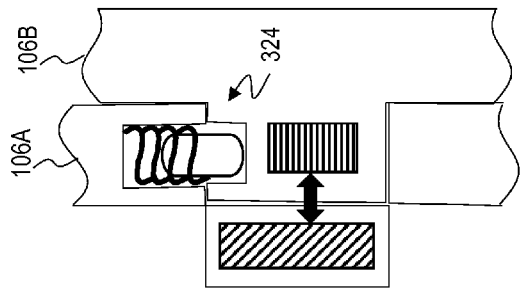
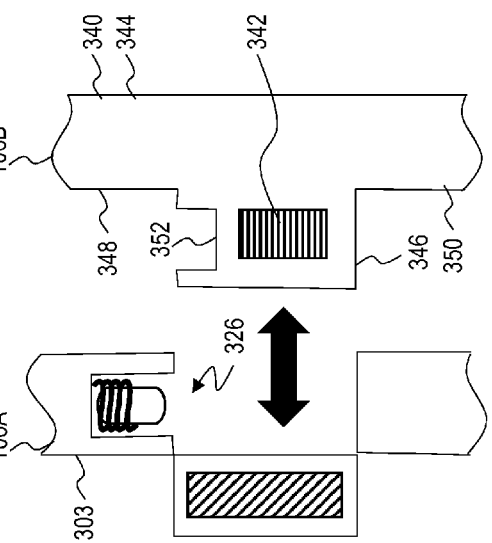
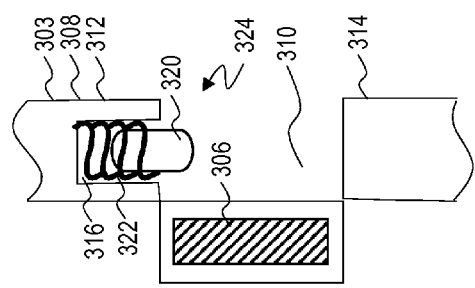
FIG. 8C
FIG. 8B
FIG. 8A

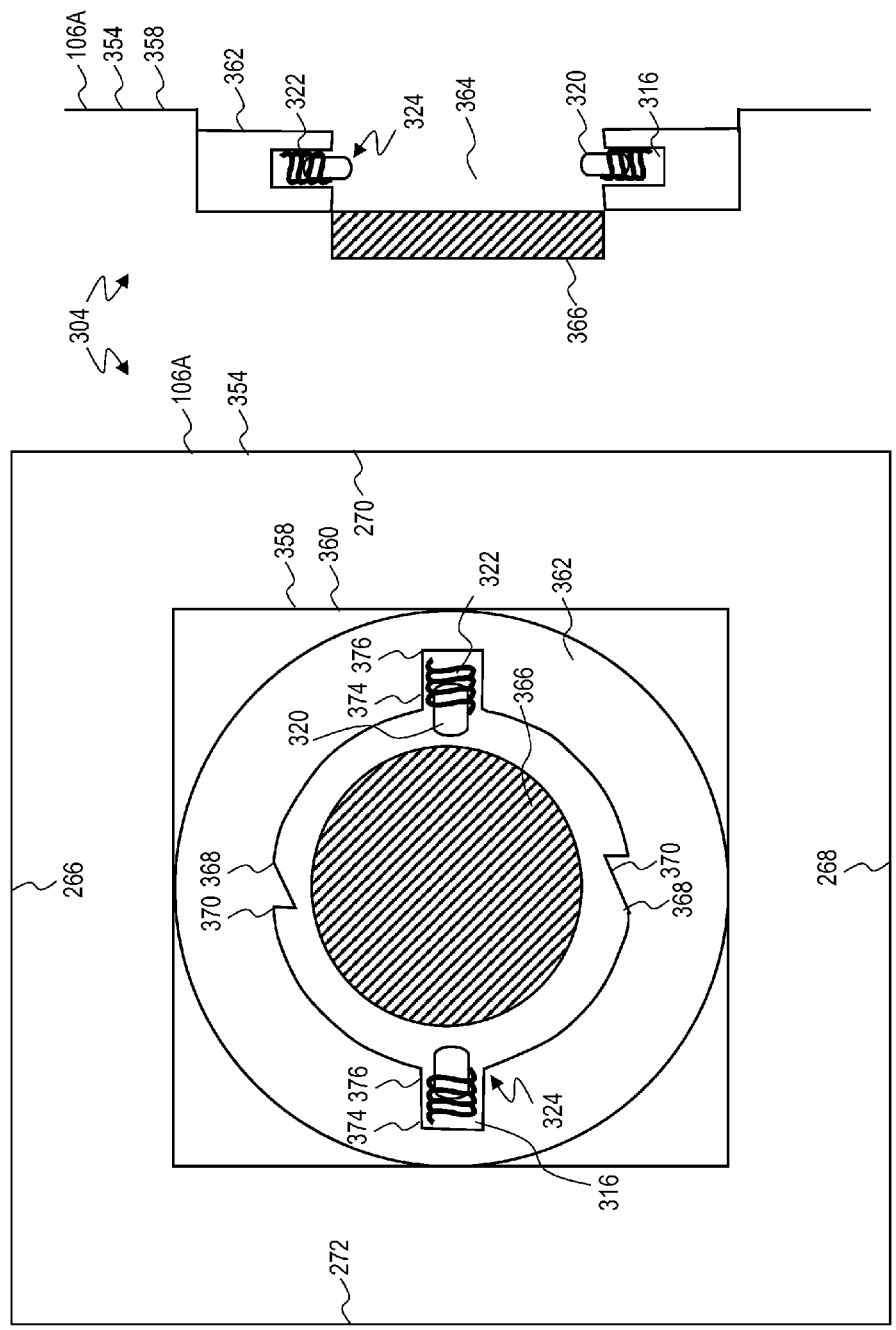

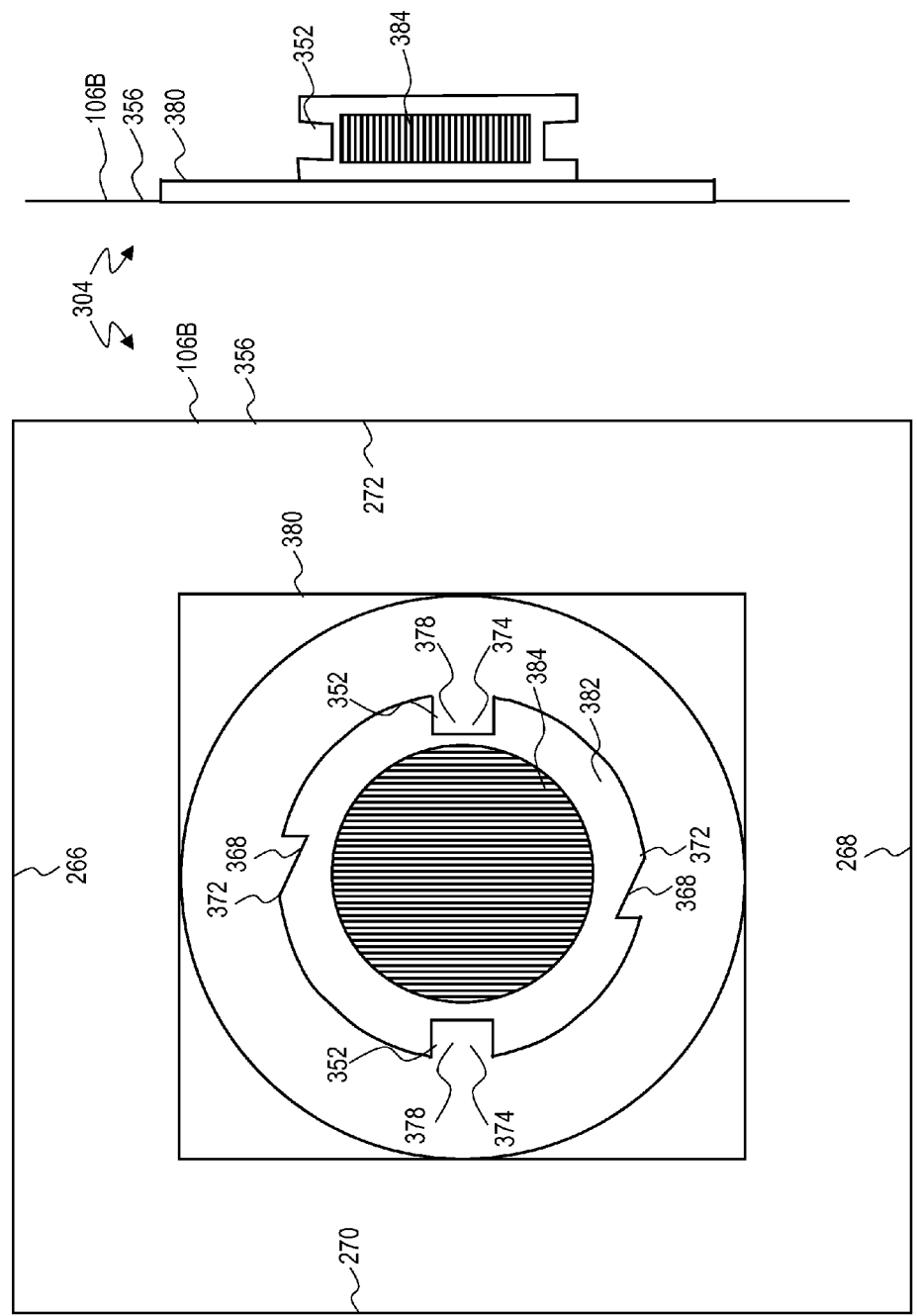

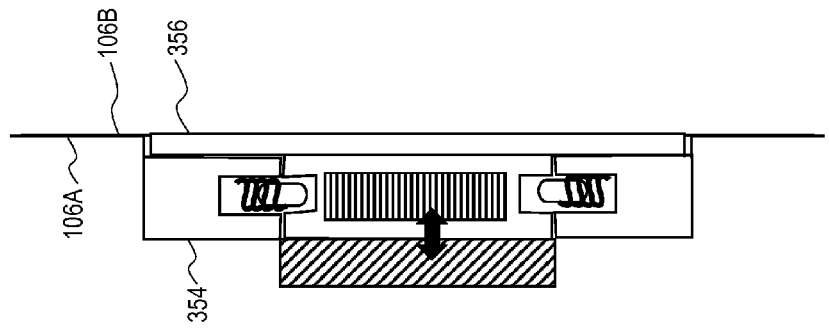
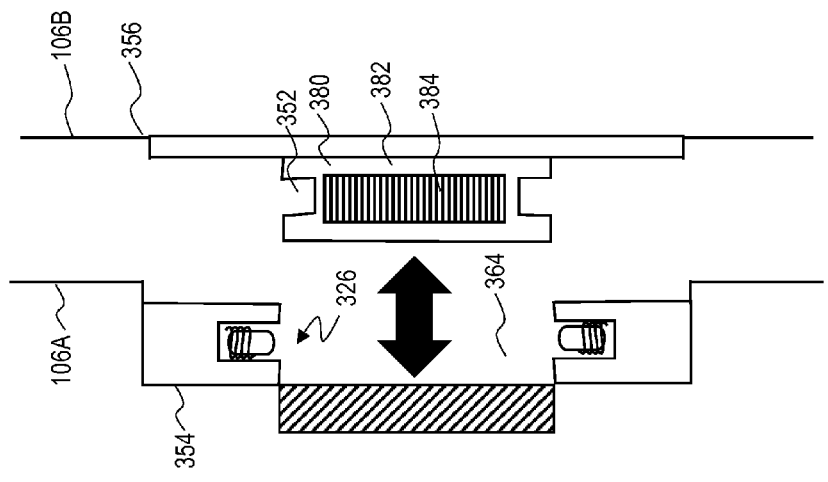
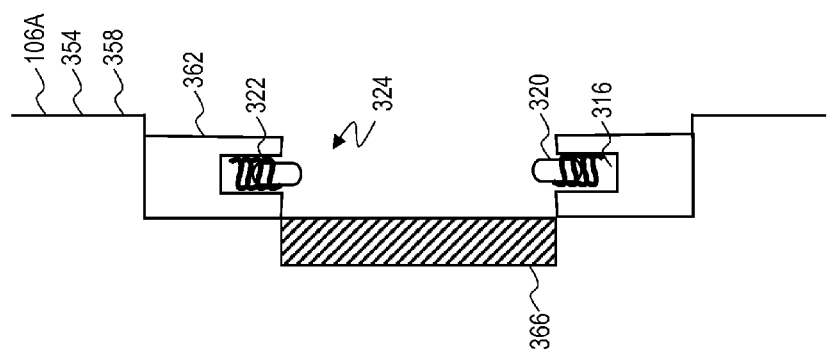

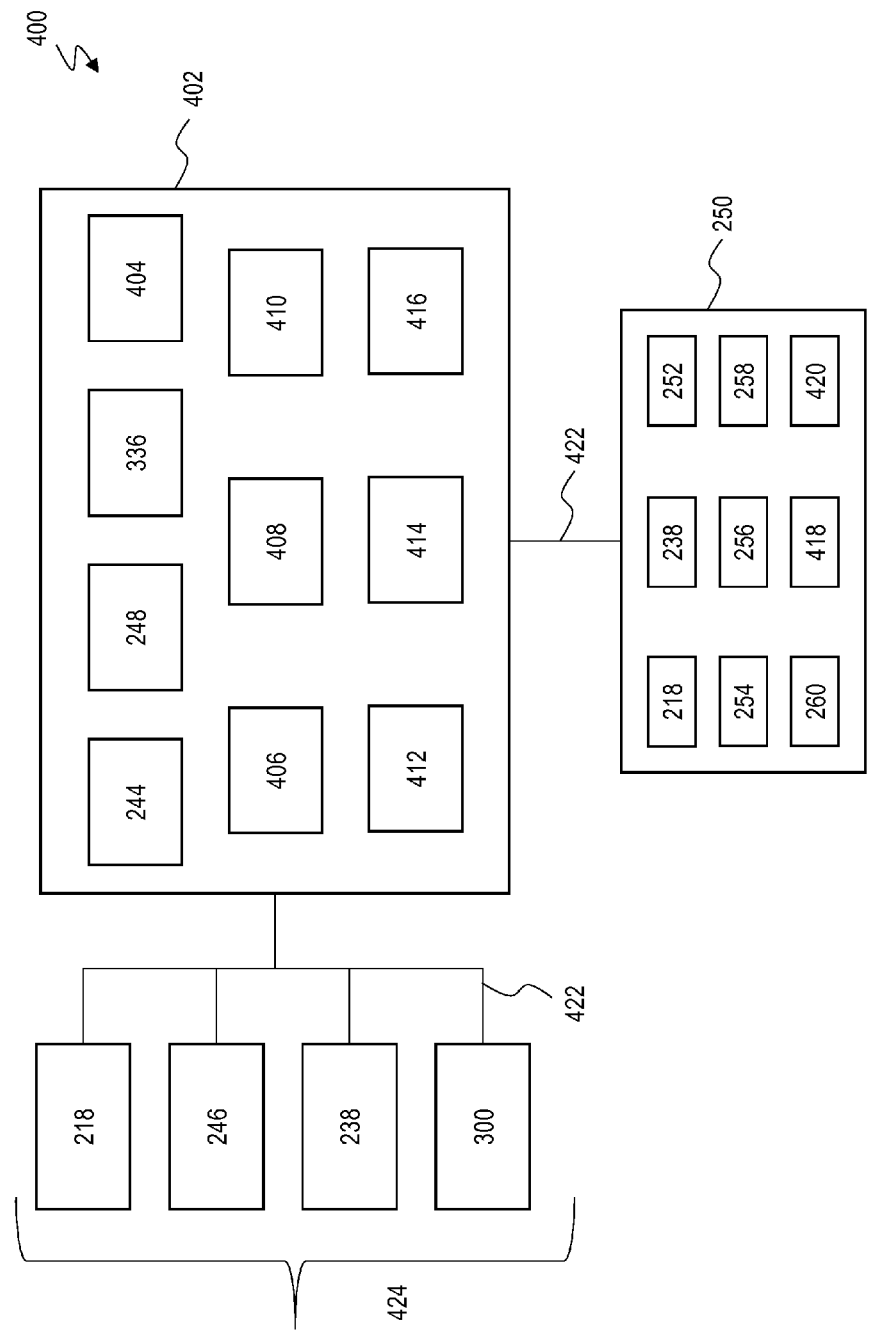

SOLAR ENERGY CONVERSION AND TRANSMISSION SYSTEM AND METHOD

PRIORITY

This application claims priority to and incorporates by reference in its' entirety, U.S. Provisional Patent Application No. 62/044,360, entitled "Solar Energy Conversion and Transmission System and Method", and filed Sep. 1, 2014.

TECHNICAL FIELD

The present invention generally relates to systems and methods to for converting solar power to microwave electric energy, transmitting the microwaves to earth, and converting the microwaves to usable electric energy. More particularly the present invention relates to converting solar energy to microwave energy with modular satellites.

BACKGROUND

In the past two decades there have been numerous proposals to deploy solar satellite farms to convert solar energy from the sun into usable electrical energy on earth. Numerous obstacles have existed to making a solar satellite farm a reality. For a conversion station on earth to be commercially viable, solar panels on the satellites must have a large enough surface area to convert a large amount of energy and transmit it to the station. Launching large satellites into space is expensive.

Many, if not most, of the proposals involve placing satellites for converting the solar energy in orbit at or near the poles, such that the satellites may convert solar energy twenty-four hours a day. But, unlike a low earth orbit nearer the equator, these orbits may be more prone to impacts from solar storm activity.

Many, if not most, of the proposals involve converting solar energy into microwaves at frequencies lower than six gigahertz. Many devices, including communication devices, operate in this range of frequencies and it may be difficult to get administrative approval to use them.

There is a need to develop additional systems and methods to convert solar energy to electricity to power loads on the earth, with satellites in space.

SUMMARY OF THE INVENTION

In one aspect of the invention, a modular satellite for converting solar energy to microwave energy and transmitting the microwave energy to the earth to be converted into electricity is disclosed. The satellite includes solar panels configured to convert solar energy into direct current; a magnetron operatively connected to the solar panels to receive the direct current and configured to convert the direct current into microwave energy; a planar wave guide antenna operatively connected to the magnetron to receive the microwave energy and direct the microwave energy to a station on earth; and a coupling system for coupling with another satellite to form an array in response to at least one of locking, unlocking, and navigational commands. The satellite has a mass equal to or less than four kilograms, and a volume equal to or less than three liters.

In another aspect of the invention, a satellite array for converting solar energy to microwave energy and transmitting the microwave energy to the earth to be converted into electricity includes multiple satellites coupled together to form the array. Each satellite includes one or more solar panels configured to convert solar energy into direct one or more solar panels configured to convert solar energy into direct current; a magnetron operatively connected to the solar panels to receive the direct current and configured to convert the direct current into microwave energy; and one or more wave guides operatively connected to the magnetron to receive the microwave energy and direct the microwave energy to a station on earth. The satellites are all coupled such that the solar panels of each satellite face the sun, and the wave guides face the earth. The array generates and transmits to earth microwave energy with a frequency in the range of fourteen and seven tenths gigahertz to eighteen and seven tenths gigahertz.

In another aspect of the invention, a method for converting solar energy solar energy to microwave energy with an array of satellites and transmitting the microwave energy to the earth to be converted into electricity is disclosed. The array of satellites includes multiple satellites. Each satellite includes at least one solar panel, wave guide, and magnetron. Each satellite has a mass equal to or less than four kilograms. The method includes transporting each of the satellites in the array to a space station with a cargo load for the space station, and launching each of the satellites into a geo-stationary low earth orbit between fifty-two degree latitude north and fifty-two degree latitude south from the space station. The method also includes coupling all the satellites together in an array wherein the solar panels of each satellite face the sun, and the wave guides face the earth; and converting solar energy into direct current with the solar panel of at least one satellite. The method also includes converting the direct current into microwave energy with the magnetron of at least one satellite, the microwave energy having a frequency in the range of fourteen and seven tenths gigahertz and eighteen to seven tenths gigahertz; transmitting the microwave energy to a station on earth with the wave guide of at least one satellite; and converting the microwave energy into one of alternating current or direct current to power a consumer load on earth.

BRIEF DESCRIPTION OF THE DRAWINGS

FIG. 7A is a cross section view of a first side apparatus and schematic of a first coupling apparatus for a modular satellite array according to an exemplary embodiment of the invention.

FIG. 8A is a cross section view of a portion of the first side apparatus of the first coupling apparatus for the modular satellite array of FIGS. 7A and 7B in a first default position according to an exemplary embodiment of the invention.

FIG. 8B is the cross section view of the portion of the first side apparatus of FIG. 8A of a first satellite in a second position, and a cross section view of a portion of the second side apparatus of the first coupling apparatus of FIG. 7B of a second satellite, with the first and second satellites in a position for coupling according to an exemplary embodiment of the invention.

FIG. 8C is the cross section view of the portion of the first side apparatus of the first satellite in the first default position, and the cross section view of a portion of the second side apparatus of the second satellite, with the first and second satellites in a locked position according to an exemplary embodiment of the invention.

FIG. 9A is a cross section view of a first side apparatus of a second coupling apparatus along line 9A of FIG. 9B for a modular satellite array according to an exemplary embodiment of the invention.

FIG. 9B is a cross section view of the first side apparatus of FIG. 9A along line 9B according to an exemplary embodiment of the invention.

FIG. 10A is a cross section view of a second side apparatus of a second coupling apparatus along line 10A of FIG. 10B for a modular satellite array according to an exemplary embodiment of the invention.

FIG. 10B is a cross section view of the second side apparatus of FIG. 10A along line 10B according to an exemplary embodiment of the invention.

FIG. 11A is a cross section view of the first side apparatus of the second coupling apparatus for the modular satellite array of FIGS. 9A and 9B in a first default position according to an exemplary embodiment of the invention.

FIG. 11B is the cross section view of the first side apparatus of FIG. 11A of a first satellite in a second position, and a cross section view of a portion of the second side apparatus of the second coupling apparatus of FIGS. 10A and 10B of a second satellite, with the first and second satellites in a position for coupling according to an exemplary embodiment of the invention.

FIG. 11C is the cross section of the first side apparatus of the first satellite in the first default position, and the cross section of the second side apparatus of the second satellite, with the first and second satellites in a locked position according to an exemplary embodiment of the invention.

FIG. 13 is a schematic of a control system for a satellite according to an exemplary embodiment of the invention.

DETAILED DESCRIPTION

Figure 1:
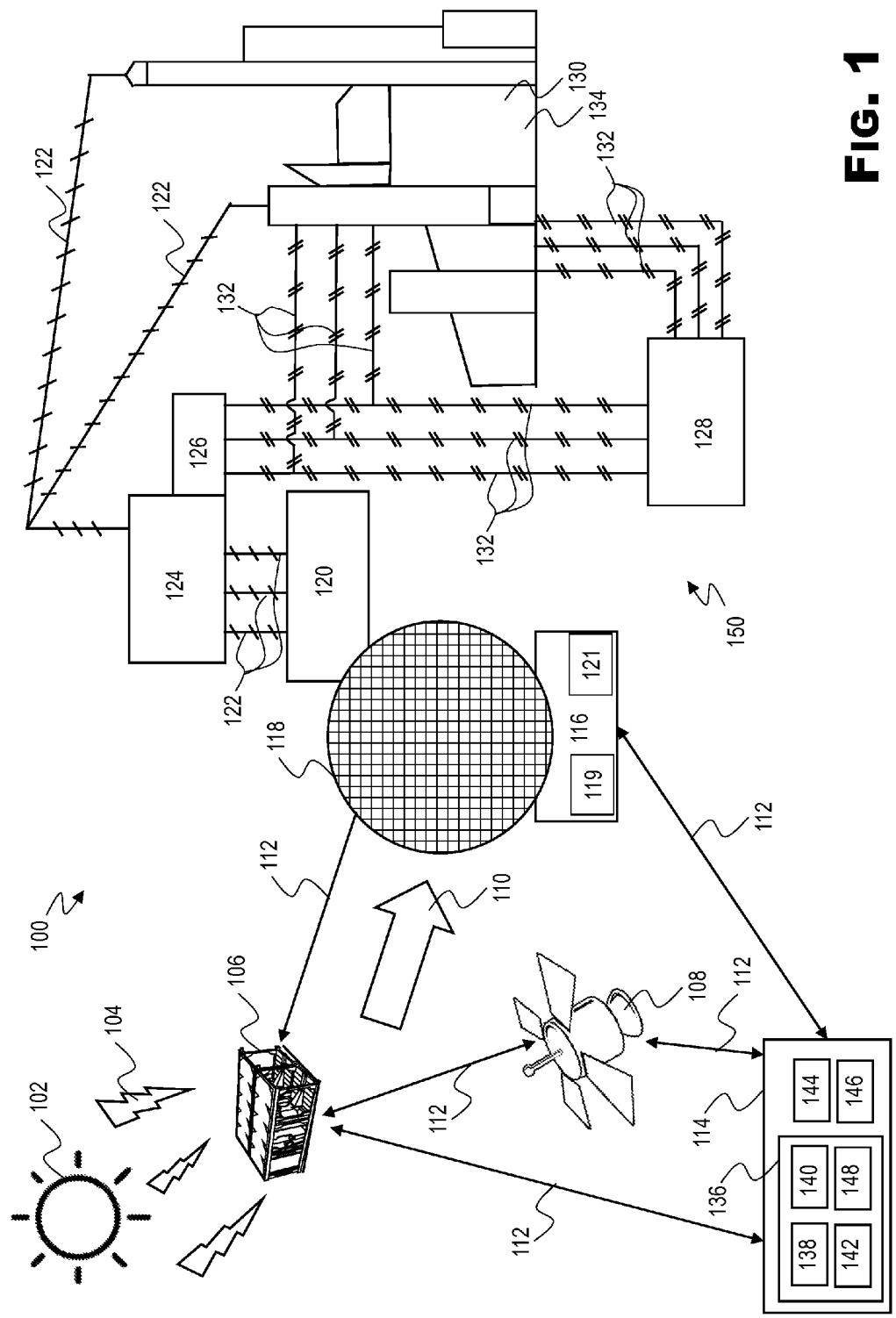
FIG. 1 is a schematic of a solar energy conversion and transmission system according to an exemplary embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above, or may only address one of the problems discussed above. Further, one or more of the problems discussed above may not be fully addressed by any of the features described below.

Satellites for use in space solar energy farms to convert and transmit energy to earth for use in powering loads on earth, may need to have adequate surface area on solar panels to convert and transmit enough energy to make building receiver stations on earth economically feasible. Large satellites with large solar panels must be launched into a space orbit and this is expensive. However, regular cargo loads are transported commercially to the international space station, and if other space stations are deployed, it is likely that regular cargo loads will be transported to them as well. If the satellites for use in a space farm are small enough in size and mass, it may be possible to transport them into space with a regular cargo load to a space station, and for the space station to launch them. The mass limit currently for the international space station is four kilograms. Although a satellite meeting the criteria for cargo loads to the space station may have a relatively small solar panel surface area, if it is coupled with other similar satellites to form an array, a large solar panel surface area may be formed. If the satellites for arrays have coupling systems controllable from the ground, the satellites can be put in orbit separately, and then coupled together in space.

Many of the proposals for satellite space solar farms, include putting the satellites converting the solar energy into an orbit near the poles where the solar panels may be exposed to sunlight twenty-four hours a day. However, in these orbits, the satellites would be vulnerable to solar activity and other hazards. If the satellites were in a geo-stationary low earth orbit between the 52 degree north latitude line and the 52 degree south latitude line, the Van Allen radiation belts might provide protection for them. Although the solar panels of the satellites would have no more than sixteen hours of sunlight, if multiple arrays, for example, three, were in this type orbit, it would be possible to transmit power to an earth station for twenty-four hours a day.

Many of the proposals for satellite space solar farms propose transmitting microwave energy to the earth at frequencies of less than six gigahertz. Most, if not all, devices on earth utilizing microwave energy, including communication devices, operate at frequencies in this range. It may be very difficult to transmit the energy in this frequency range as it may interfere with other devices and/or have problems getting regulatory approval.

To be commercially feasible, a solar energy conversion and transmission system must operate efficiently. It has been shown that microwave energy above about seventeen gigahertz transmitted from low earth orbit to earth would have a loss of over twenty percent because of interferences in the earth's atmosphere.

If solar energy is converted by satellites to microwave energy with a frequency higher than the devices currently used on earth (or at least the vast majority of them), and lower than when the transmission loss reaches economically and/or commercially unfeasible levels, the system may be more commercially viable.

Referring now to FIG. 1, an exemplary solar energy conversion and transmission system 100 is illustrated. The system 100 may include one or more satellites 106 configured to convert solar energy 104 into microwave energy 110, and transmit the microwave energy 110 to earth; a rectenna 118 configured to receive the microwave energy 110; and a ground control command station 114 configured to control navigation and positioning of the one or more satellites 106. In one embodiment, each or the one or more satellites 106 may have a mass less than four kilograms (4 kg); be deployed in a geo-stationary low earth orbit between fifty-two degree latitude north and fifty-two degree latitude south; and be configured to convert the solar energy 104 to microwave energy 110 with a frequency in the range of five to nineteen gigahertz (5-19 GHz), or fourteen and seven tenths to eighteen and seven tenths gigahertz (14.7-18.7 GHz). The frequency may, for example, be sixteen and seven tenths gigahertz (16.7 GHz). Each satellite may, for example be a 3U cubesat, comprised of three 1U cubesats. A 1U cubesat may include a miniaturized satellite usually used for space research that usually may have a volume of one liter, may be a 10 centimeter cube, have a mass of no more than 1.33 kilograms, and may use commercial off-the-shelf components for its' electronics. Each satellite 106 may include one or more solar panels 202 (shown and described in relation to FIGS. 2-4) and be positioned in orbit with the solar panels 202 in an orientation to the sun 102 to allow collection of the solar energy 104. Each satellite may include one or more wave guides 204 (shown and described in relation to FIGS. 2-4) and be positioned with the wave guides 204 in an orientation to the earth act as a wave guide antenna 282 such that microwave energy 110 is able to be collected by the rectenna 118. Each satellite 106 may include a coupling system 300 (shown and described in relation to FIGS. 7A-11C) configured to fixedly couple the satellite 106 with another satellite 106.

The satellites 106 may have reached orbit after being transported in a cargo load to a space station. The space station may have released the satellites 106 into orbit. The satellites 106 may have been coupled while in space to form one or more arrays 220 (shown and described in relation to FIGS. 3, 5, and 6). The satellites 106 may, for example be coupled into three arrays, each array at a different position in orbit.

The rectenna 118 may include a rectifying antenna configured to convert the microwave energy 110 into direct current (DC) electricity as known in the art. The rectenna 118 may be communicatively connected with at least one of the satellites 106 through a communication link 112 to facilitate targeting of the microwave energy 110. In one embodiment, the rectenna 118 may be configured to generate two wireless pilot signals at different frequencies which may be received by at least one of the satellites 106.

The ground control command station 114 may be communicatively linked to the one or more satellites 106, through communication link 112, to send control commands to the satellites 106. The station 114 may include a computer 136, which may in some embodiments include multiple computers linked together. The computer 136 may include one or more processors 138 and one or more memory components 140. The memory components 140 may include computer readable code written on a tangible computer readable media which when read by the processor causes the station 114 to implement all or part of the methods described below and shown in relation to FIGS. 14A-18D. The computer 136 may include a targeting module 142 which may include computer readable code written on a tangible computer readable media which when read by the processor causes the station 114 to send and receive messages to and from the satellites 106 which cause the satellites 106 to be positioned to send the microwave energy 110 to the rectenna 118. The computer 136 may include a satellite control module 148 which may include computer readable code written on a tangible computer readable media which when read by the processor causes the station 114 to send and receive messages to and from the satellites 106 which cause the satellites 106 to perform various functions such as, but not limited to, coupling, establishing an orbit, deorbiting, performing diagnostics, and establishing a communication architecture among the satellites 106. The station 114 may include one or more receivers 144 and one or more transmitters 146 for communicating with the satellites 106, one or more GPS satellites 108, and a pilot command station 116.

The system 100 may also include the pilot command center 116, the one or more GPS satellites 108, and a power distribution and conversion system 150. The pilot command center 116 may include computers, receivers, and transmitters (not shown) to control the pilot signals from the rectenna 118 to the satellites 106. In one embodiment the pilot command center 116 may include a pointing gimbal 119 to align an antenna 121 for sending the pilot signals. Some navigational commands and messages may be sent by the ground control command station 114 to the satellites 116, through the GPS satellite 108. In addition, the command station 114 and satellites 106 may receive information from the GPS satellite 108 which may be utilized for navigational and positional control methods.

The power distribution and conversion system (power system) 150 may include devices, stations, and/or control apparatus to transmit and convert the DC power collected by the rectenna to a load 134 of a consumer. The power system 150 may include many embodiments as would be known in the art. In the illustrated embodiment, the power system includes a rectenna transmission center 120, a DC distribution center 124, and inverter station 126, and a utility station 128. The rectenna transmission center 120 may transmit DC power via DC power links 122 to a DC distribution station 124. The DC distribution station 124 may transmit DC power to consumers 134 with power equipment to receive DC power through DC links 122, and may transmit DC power to an inverter station 126. The inverter station 126 may convert the DC power to AC power, as is known in the art, and transmit the AC power directly to consumer 134, and to the utility station 128 via Ac power links 132. The utility station 128 may receive power from other sources in addition to the rectenna 118.

Figure 2:
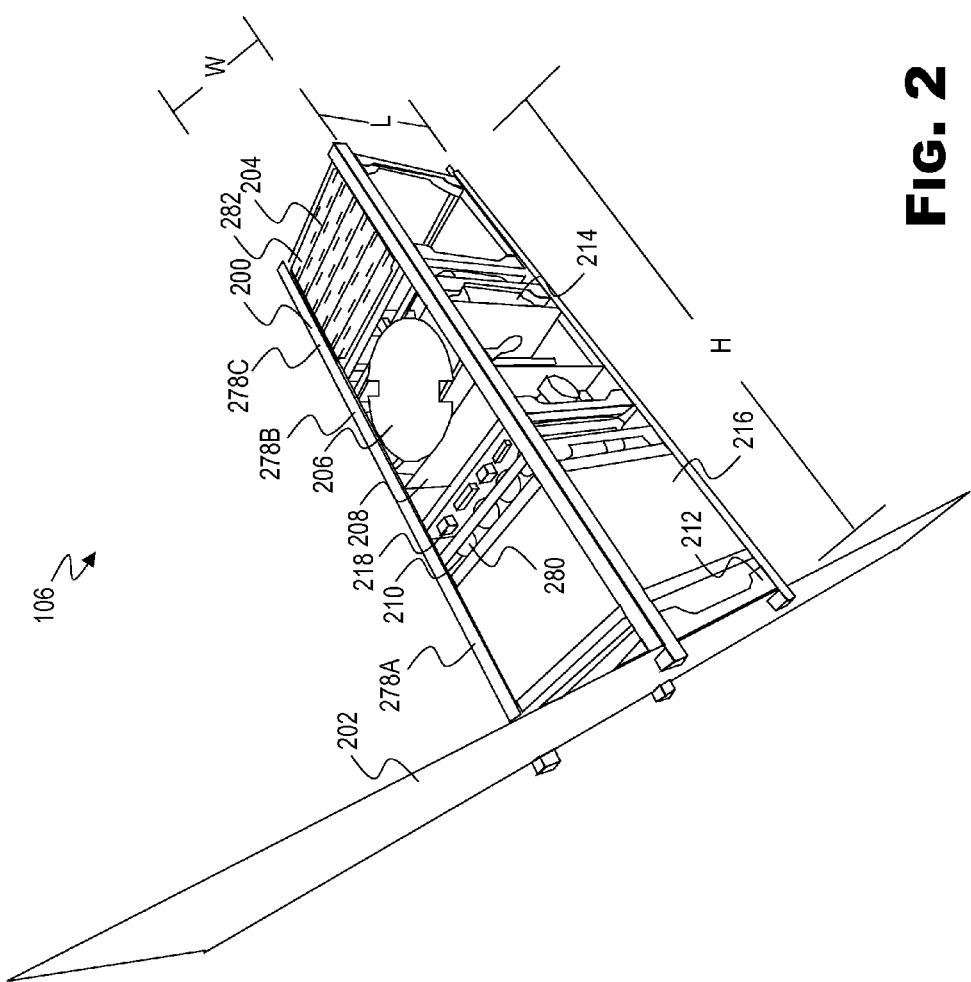
FIG. 2 is a perspective view of a first embodiment of a satellite according to an exemplary embodiment of the invention.

Referring now to FIG. 2, a first exemplary embodiment of the satellite 106 is illustrated. In this embodiment the satellite 106 includes solar panels 202 which may be actuated to fold out to an open position as shown, or fold in to a closed position such that the satellite 106 has a compact rectangular shape. The satellite may include a frame 200, one or more wave guides 204, an S-band patch antenna 206, an interface hub 208, a power storage unit 210, an S-band transmitter 212, a magnetron 214, a 3-axis reaction wheel 216, and an attitude detector and control 218. The satellite 106 may have a mass of less than 4 kg to allow it to be transported to the international space station in regular cargo trips, and be deployed by the international space station. The relatively small mass may allow the satellite 106 to be transported into orbit by other means as well—such as on regular space flights. An obstacle to the development of a space solar power system with satellites collecting solar power may be the high cost of deploying satellites into space. Satellites with smaller mass and size may piggy back a ride into space on already scheduled missions and/or trips. This may reduce cost and make it economically feasible to deploy a space based solar power system.

The frame 200 may include elongated solid members, and a coupling system 300 (described below in relation to FIGS. 7A-11C). The frame 200 may define the shape of the satellite 106 when the solar panels 202 are closed, with a height H, a width W, and a length L. The height H may be in the range of eight to twelve centimeters (24 cm-36 cm), for example thirty centimeters (30 cm). The width W may be in a range of eight to twelve centimeters (8 cm-12 cm), for example ten centimeters (10 cm). The length L may be in a range of eight to twelve centimeters (8 cm-12 cm), for example ten centimeters (10 cm). The frame 200 may include three cubic sub-frames 278A, 278B, and 278C. The relatively small size of the frame 200 may allow the satellite 106 to be transported into orbit at a commercially reasonable price.

The solar panels 202 may convert solar energy 104 to DC electric current as is known in the art. Solar panels 202 for satellites are known in the art and many embodiments are commercially available. The solar panels 202 illustrated may be actuated between a first open position and a second closed position.

The wave guide 204 may include a structure which guides the electromagnetic waves generated by the magnetron 214 to be radiated in a pattern such that a majority of the microwave energy 110 from the satellite 106 reaches the rectenna 118 to be converted into usable energy. The wave guide 204 may act as a wave guide antenna 282 which may act as a transmission antenna for the electromagnetic waves generated by the magnetron 214. The wave guide 204 is more fully described below in relation to FIG. 12.

The satellite 106 may include a receiver 414 and transmitter 416 (shown and described in relation to FIG. 13) to receive and transmit messages to the command station 114 and/or the GPS satellite 108. In the embodiment illustrated the receiver 414 and transmitter 416 include an S-band patch antenna 206, and an S-band transmitter 212. Other receivers and transmitters as would be known in the art may alternatively be used.

The interface hub 208 may include a controller circuit which may provide communication between the different components of the satellite 106, and may be an embodiment of the control system 400 shown and described in relation to FIG. 13.

The satellite 106 may include a power storage unit 210 which may include the battery pack 280 in the embodiment illustrated. There may be periods of time when the solar panels 202 are not producing, or not producing enough, energy to power the satellite's internal systems. During these times, the power storage unit 210 may provide the needed energy to power the satellite 106. The power storage unit 210 may also provide power to the satellite 106 to deorbit if the satellite 106 is damaged or malfunctions.

The magnetron 214 may include a high-powered vacuum tube that converts the DC energy produced by the solar panels 202 to electromagnetic waves using the interaction of the stream of electrons from the DC power with a magnetic field while moving past a series of open metal cavities as is known in the art. The magnetron 214 and the metal cavities' physical dimensions may be configured to produce electromagnetic waves in the frequency range of 14.7 GHz-18.7 GHz (for example 16.7 GHz), a wave length range of 16.0 mm-20.4 mm (For example 18.0 mm), and power in the range of 60 KW-1.5 MW (for example 1 MW). The magnetron 214 may be operatively connected to the one or more wave guides 204 through, for example, couplings and flanges as shown and described in relation to FIG. 4.

The satellite 106 may include a stability control device. In the embodiment illustrated, the stability device includes a 3-axis reaction wheel 216 which may provide stability for the satellite 106, prevent the satellite 106 from wobbling, and/or keep the satellite 106 moving evenly in orbit. 3-axis reaction wheels are known in the art and available commercially.

The attitude detector and control 218 may be a portion of the control system 400 which detects the orientation satellite 106 in relation to the sun 102 and/or the earth; and the orbital position of the satellite. The attitude detector and control 218 may also control various satellite 106 components to move the satellite 106 to a desired position and/or orientation to transmit microwave energy 110 to the rectenna 118 and/or couple with other satellites 106. The attitude detector and control 218 will be further described in relation to FIGS.

16B-16F. Some embodiments of the attitude detector and control are commercially available.

Figure 3:
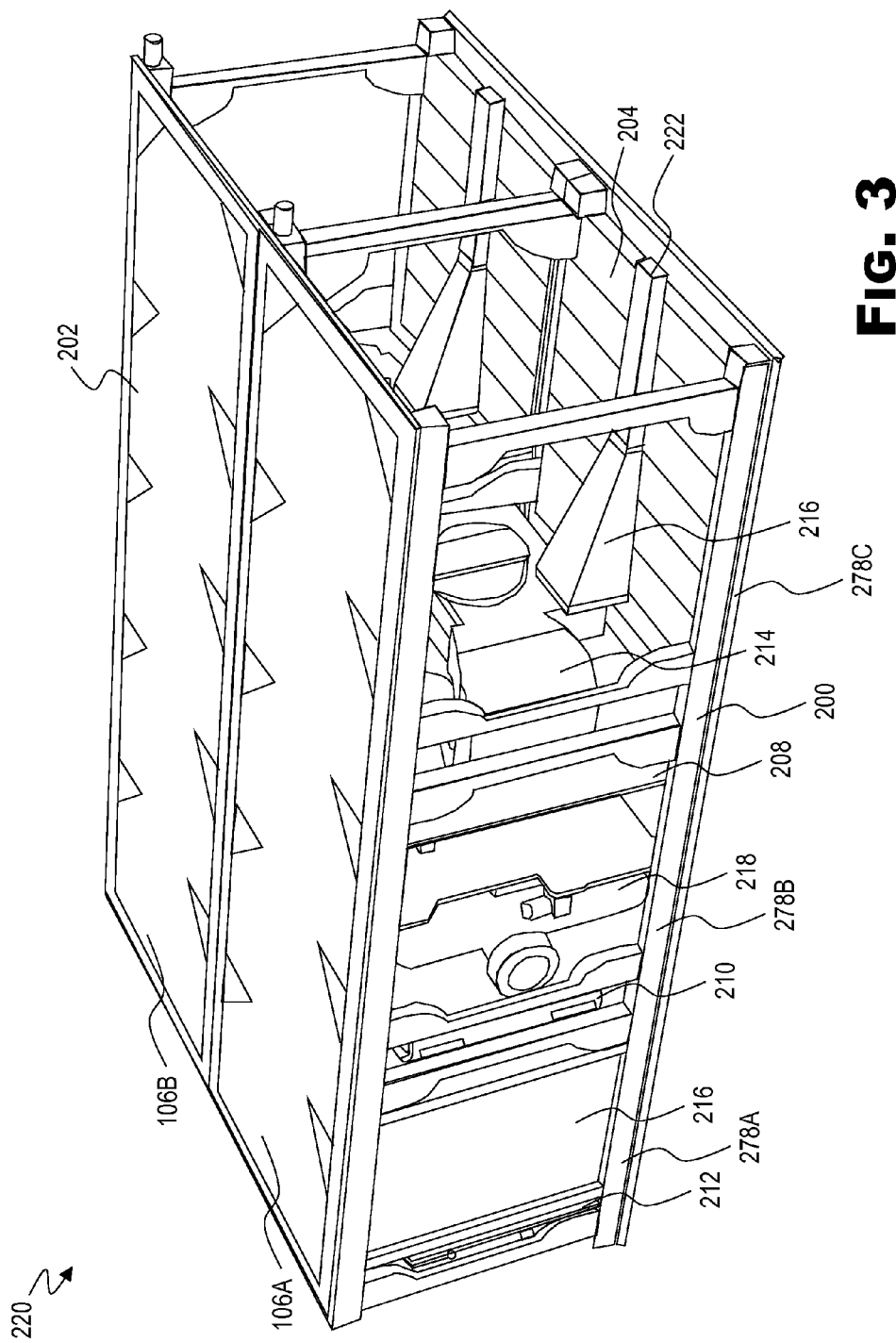
FIG. 3 is a perspective view of a modular satellite array of second embodiments of satellites according to an exemplary embodiment of the invention.

Referring now to FIG. 3, an exemplary modular satellite array 220 is illustrated of a second embodiment of the satellite 106. In the second embodiment of the satellite 106, the solar panels are on one side of the satellite 106 and the wave guides 204 are on the opposite side of the satellite 106. The satellites 106A, 106B are fixedly coupled to form an array of satellites 106 with the solar panels 202 of each satellite 106 in the array 220 on one side, and the wave guides 204 of each satellite 106 on the opposite side. Although the array 220 is illustrated with two satellites, the array 220 may include any number of satellites 106 as described more fully in relation to FIG. 5.

Figure 4:
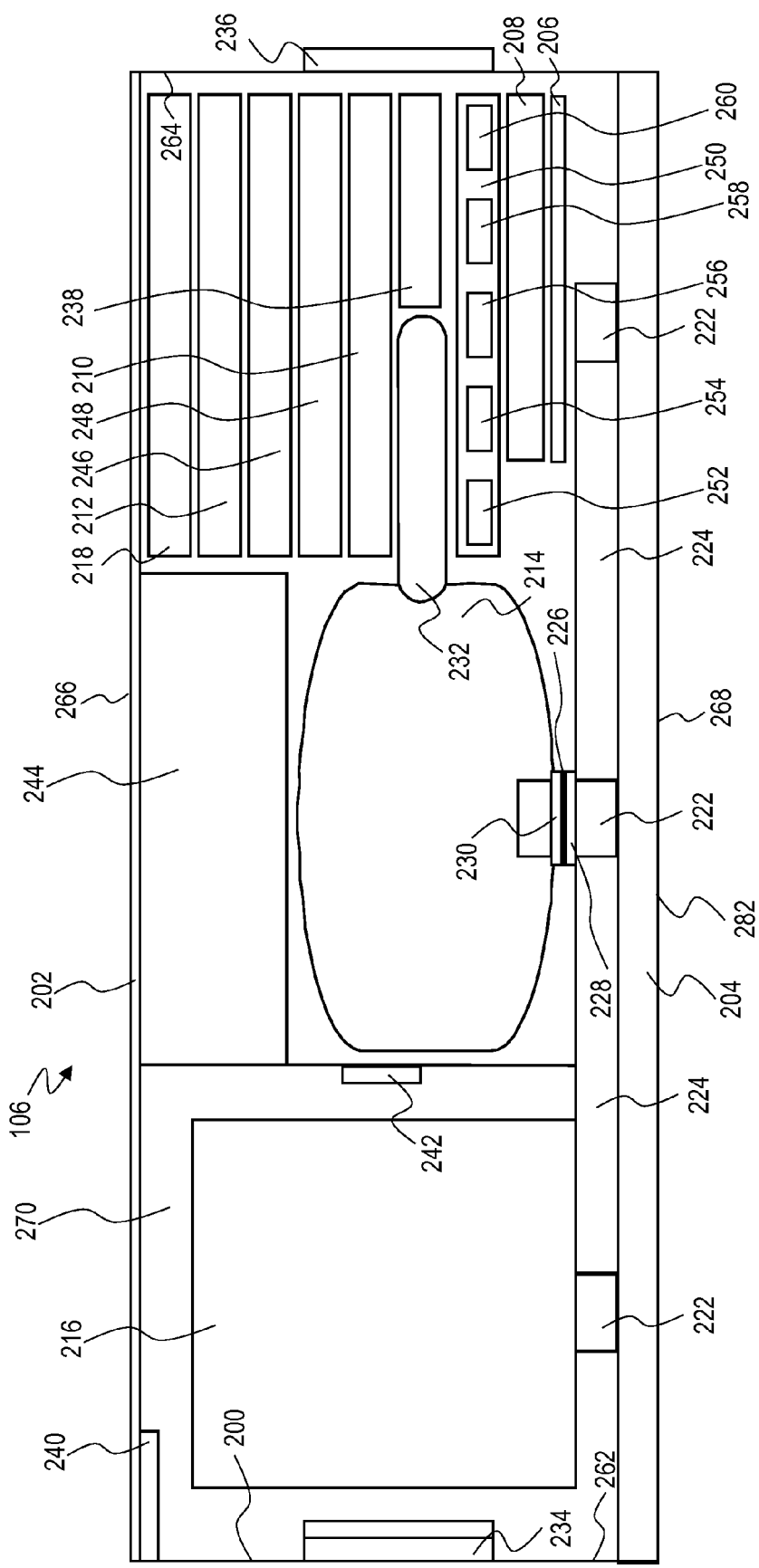
FIG. 4 is a side schematic view of the satellites of FIG. 3 according to an exemplary embodiment of the invention.

Referring now to FIG. 4, a side schematic view of an third exemplary embodiment of the satellite 106 is illustrated. The satellite 106 may include a first end 262, a second end 264, a solar panel side 266, a wave guide side 268, a first polarity side 270, and a second polarity side 272. The solar panels 202 may be located on the solar panel side 266, and the wave guides 204 acting as wave guide antennae 282 (shown and described in relation to FIG. 2) may be located on the wave guide side 268.

The magnetron 214 may include a cathode tube 232. The cathode tube 232 may be heated and electrons may flow through cathode tube to an anode and the magnetron 214 may convert the DC current to electromagnetic waves as is known in the art. The electromagnetic waves may flow out of the magnetron 214 through a wave guide output flange 230. The electromagnetic waves may flow through a wave guide input flange 228, into a wave guide transmission coupling 224, into a wave guide feeder 222, and to the wave guide 204. A wave guide connection flange 226 may connect the wave guide output flange 230 and the wave guide input flange 228.

The satellite 106 may include a female end cap magnetic lock 234, and a male end cap lock 236 which will be further described below in relation to FIGS. 9A-11C.

The satellite 106 may include a differential absorption detection and ranging module (LIDAR or DIAL) 238 which may include computer readable code written on a tangible computer readable medium which when implemented on a processor 404 (shown in and described in relation to FIG. 13) may generate a signal indicative of the location of the rectenna 118, at least in part, as a result of a first pilot signal and a second pilot signal. The pilot command center 116 may generate and transmit the first pilot signal and the second pilot signal. The first pilot signal may be a signal at a frequency which interacts locally to the wave guide antenna 282 surface. The second pilot signals may be a signal at a frequency which will not interact locally to the wave guide antenna 282 surface. The DIAL 238 may determine the location of the rectenna 118, at least in part, as a result of a detected interaction between the first signal locally to the wave guide 204; and a determined difference between the interaction of the first pilot signal locally to the wave guide, and the non-interaction of the second pilot signal locally to the wave guide 204. In general, the more interaction between the first pilot signal and the wave guide, the higher the density of an interaction cloud will be, and the more aligned the wave guide antenna 282 is with the rectenna 118. Measuring the difference between pilot signals by DIAL is known in the art. Targeting through measuring with DIAL locally to a surface is an exemplary embodiment of the invention.

The satellite 106 may include an intra-satellite communication radio 240 for communications between satellites 106. As an alternative to the command station 114 communicating directly with each satellite 106 in an array 220, an architecture for communication between the individual satellites may be set up. This architecture is further described below in relation to FIG. 6. The radio 240 may allow the satellites 106 in the array 220 to communicate. The radio 240 may be a 6LoWPAN radio, or any other suitable radio as known in the art. The radio 240 may ensure the security of data communicated between satellites through encrypting the data. The radio 240 may have a communication range of between the length of 1 and 10,000 satellites 106. The range of the radio 240 may be chosen based on the approximate size and dimension of satellite 106 and the size of array 220.

The satellite 106 may include a beacon 242 which may generate and transmit a low channel regular beep such that the command station 114 may track the satellite 106 at all times, even if the satellite 106 is unable to communicate through the receiver 414, transmitter 416, and radio 240.

The satellite 106 may include a de-orbiter module 244 which may be part of the control system 400 and may include computer readable code on a tangible computer readable medium, which when implemented on the processor 404 causes the satellite 106 to separate from any other satellites 106 it may be coupled to, and return to earth in a safe manner. The de-orbiter module 244 may be activated when an electrical power system 246 of the satellite 106 is no longer capable of meeting the power demands of the satellite 106.

The satellite 106 may include an electrical power system 246 and a power distribution module 248. The electrical power system 246 which may include an integrated circuit (IC) component which may be commercially available. The electric power system 246 may convert the DC current from the solar panels 202 to power usable by a power distribution module 248. The power distribution module 248 may include components and software to manage power for satellite 106 components. The software may include computer readable code on a tangible computer medium, which when implemented by the processor 404 distributes the power produced by the solar panels 202 to satellite components at levels and in forms the components may use, and/or prioritizes which components receive what level of power. The power distribution module 248 may also include hardware components to transmit correct levels and forms of power to satellite 106 components as is known in the art.

The satellite 106 may include various sensors 250 which generate signals indicative of various parameters of the satellite 106 and the satellite environment which may be needed to operate the various functions of the satellite. The sensors 250 may include, but are not limited to, a sun sensor 252, an earth (or nadir) sensor 254, a magnetometer 256, a gyroscope 258, and a star tracker 260. The sensors 250 may be communicatively linked with a controller 402 (shown in and described in relation to FIG. 13).

The sun sensor 252 may include any device configured to measure, and generate a signal indicative of, the position of the sun 102 relative to the satellite 106. For example, the sun sensor 252 may include a device which measures the incident angle of rays of the sun 102 when the rays go through a small window, or a device which measures photons. The sun sensor 252 may also generate a signal indicative of bursts of energy from the sun 102 which may cause electrical interference. Various types of sun sensors 252 are known in the art. The earth sensor 254 may include any device that senses, and generates a signal indicative of, the direction to Earth. The earth sensor may include, for example, an infrared camera. Various types of earth sensors 254 are known in the art.

The magnetometer 256 may include any device configured to measure, and generate a signal indicative of the strength and/or the direction of a magnetic field at a point in space. The satellite 106 may include multiple magnetometers 256 to sense the magnetic fields of components of the satellite 106 and/or of the earth. The controller 402 may utilize the magnetic field of the earth to align the satellite 106. A magnetometer 256 may also be used to monitor the magnetic field of the magnetron 214.

The gyroscope 258 may include any device with a spinning wheel or disc in which the axis of rotation may be free to assume any orientation. When rotating, the orientation of this axis may be unaffected by tilting or rotation of the mounting, according to the conservation of angular momentum. The gyroscope 258 may sense, and generate a signal indicative of, the rotation of the satellite 106, which may be utilized by the controller 402 to manage spin of the satellite 106.

The star tracker 260 may include any optical device which may measure the position of one or more stars using one or more photocells and/or a camera, and generate a signal indicative of the satellite's 106 position, at least in part, as a result of the position of the one or more stars. The star tracker 260 may generate a signal that is indicative of both longitude and latitude. Star trackers 260 are known in the art.

Figure 5:
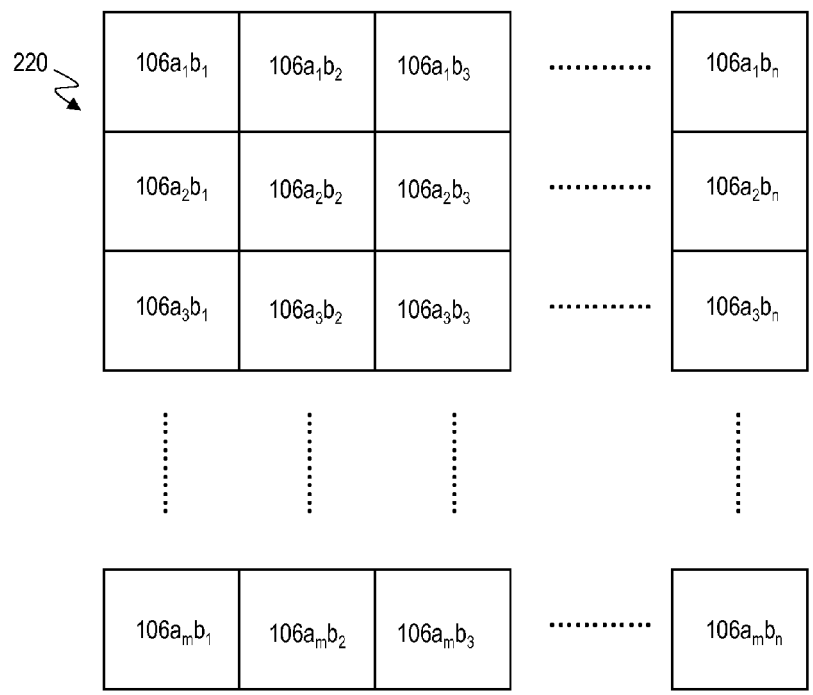
FIG. 5 is a schematic of modular satellite arrays according to an exemplary embodiment of the invention.

Referring now to FIG. 5, a schematic of an exemplary modular satellite array 220 is illustrated. The schematic shows satellites 106 in an array 220 with rows (a) and columns (b). The row that a satellite 106 is in is indicated by the subscript number of the "a". The column that the satellite 106 is in is indicated by the subscript number of the "b". The array illustrated includes m number of rows, and n number of columns. Any satellite 106 is fixedly connected to satellites 106 adjacent to it. An exemplary coupling system 300 is illustrated in FIGS. 7A-11C.

Figure 6:
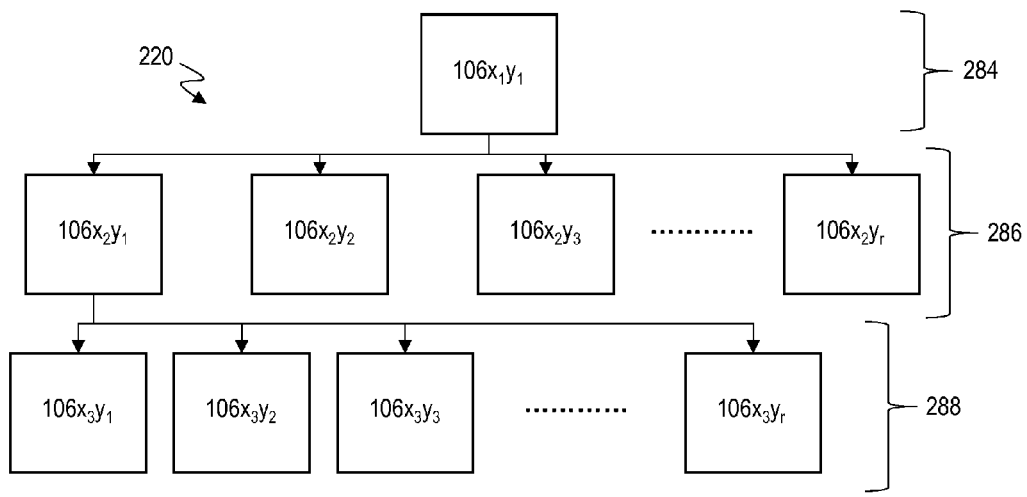
FIG. 6 is a schematic of a communication architecture of a modular satellite array according to an exemplary embodiment of the invention.

Referring now to FIG. 6, an exemplary communication architecture for satellites 106 in an array 220 is illustrated. Alternatively to the command station 114 and/or the GPS satellite 108 communicating directly with each satellite 106, a communication architecture may be used for arrays 220. The illustrated architecture includes a coordinator controller 284, multiple coordinators 286 in a layer under the coordinator controller 284, and multiple routers (or agents) 288 under each coordinator. The illustrated embodiment includes three layers in a pyramid type structure, however in other embodiments there may be less or more layers, and the structure may be a different type, as known in the art. As illustrated, the "x" subscript indicates the layers (in this case there are three), and the "y" subscript is a unique number within the layer (in this case illustrated as r).

Each satellite 106 in the array 220 may have a unique identifier, and each satellite's control system 400 may have the unique identifier, as well as other satellite's identifiers stored in a memory component 406 (shown in and described in relation to FIG. 13). In some embodiments, all satellites 106 may store all unique identifiers. In other embodiments, a satellite 106 may only store the identifiers of the satellites 106 in the layer above and below. Each satellite 106 may be able to communicate with some or all of the other satellites 106 through the radio 240. The command station 114 and/or the GPS satellite may communicate with the coordinator controller 284. The coordinator controller 284 may process messages from the command station 114 and/or the GPS satellite, and the coordinators 286. The coordinators 286 may process messages from the coordinator controller 284 and the router/agents 288 they are connected with in the architecture. The designation of coordinator controller 284, coordinator 286, and/or router/agent 288 may not be a permanent designation for a particular satellite 106 and may change. Changes on communication designations may be made when a satellite malfunctions, is running low on power, or any other reason known in the art for changing a satellite's 106 designation within a communication architecture.

Figure 7B:
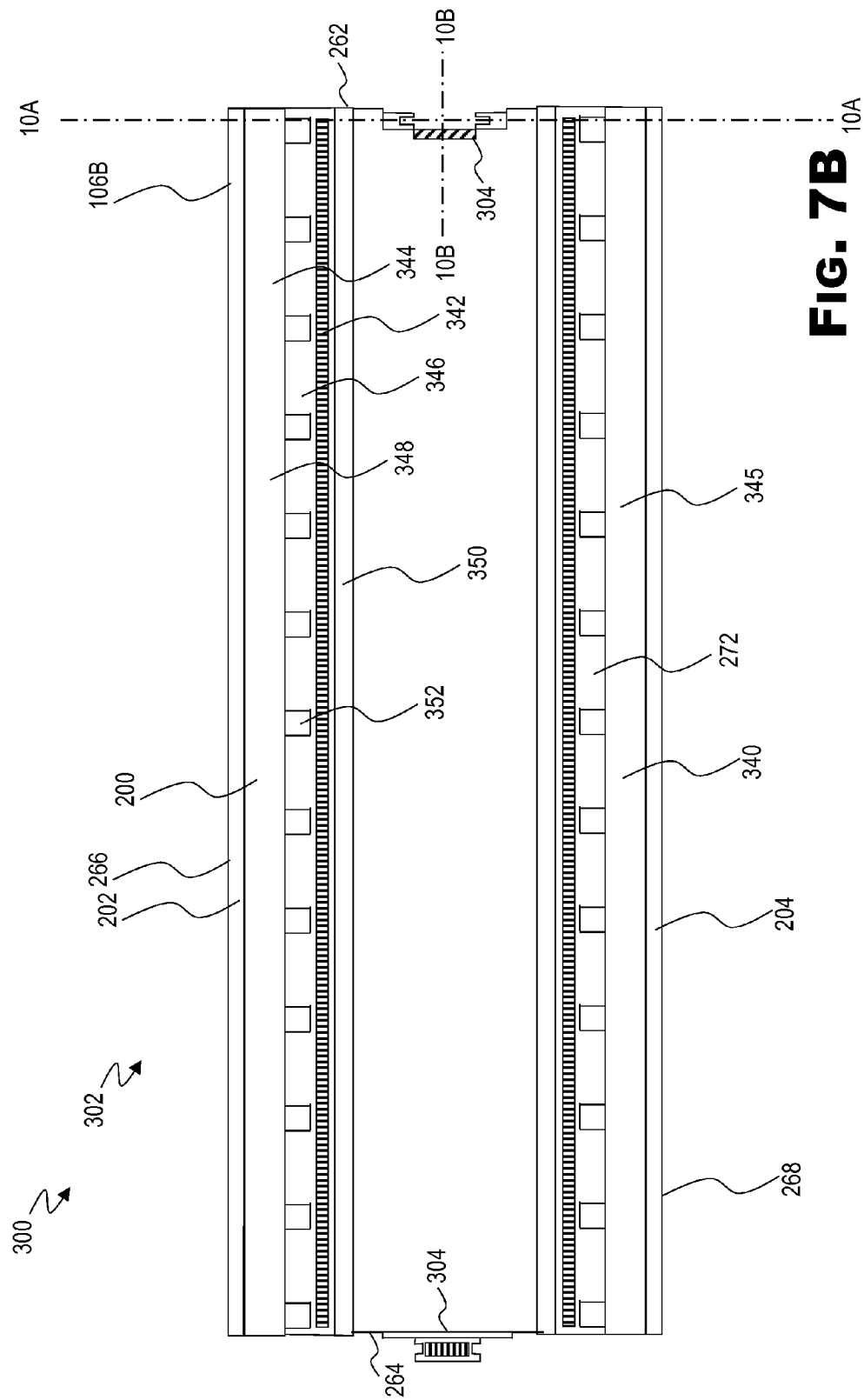
FIG. 7B is a cross section view of a second side apparatus and schematic of the first coupling apparatus for a modular satellite array of FIG. 7A according to an exemplary embodiment of the invention.

Referring now to FIGS. 7A-11C, an exemplary coupling system 300 for an array 220 is illustrated. A first coupling apparatus 302 including a first side apparatus 303 and a second side apparatus 340 is illustrated in FIGS. 7A-8C. FIG. 7A illustrates the first side apparatus 303 of a first satellite 106A, FIG. 7B illustrates the second side apparatus 340 of a second satellite 106B, and FIGS. 8A-8C illustrate a coupling of the first side apparatus 303 and the second side apparatus 340. The first coupling apparatus 302 may couple the first polarity side 270 of the first satellite 106A, with the second polarity side 272 of the second satellite 106B, the first satellite 106A different than the second satellite 106B. A second coupling apparatus 304 including a first side apparatus 354 and a second side apparatus 356 is illustrated in FIGS. 9A-11C. FIGS. 9A and 9B illustrate the first side apparatus 354 of the first satellite 106A, FIGS. 10A and 10B illustrate the second side apparatus 356 of the second satellite 106B, and FIGS. 11A-11C illustrate a coupling of the first side apparatus 354 and the second side apparatus 356. The second coupling apparatus 304 may couple the first end 262 of the first satellite 106A, with the second end 264 of the second satellite 106B, the first satellite 106A different than the second satellite 106B. In alternative embodiments, other coupling systems 300 as known in the art may be used. Although illustrated as coupling the first satellite 106A and the second satellite 106B, it should be understood that the same coupling system 300, or other coupling systems 300 as known in the art, may be used to form the array 220.

Referring now to FIG. 7A, the first side apparatus 303 may include a first frame member 308, a second frame member 309 of the frame 200, and locking mechanisms 318. The first frame member 308 may be located at along the length of the satellite 106A where the solar panel side 266 joins the first polarity side 270. The second frame member 309 may be located at along the length of the satellite where the wave guide side 268 joins the first polarity side 270. Both the first frame member 308 and the second frame member 309 may include a channel 310 along the length of the frame member 308, 309. The channel 310 may be bordered along its' length by a pin portion 312 with multiple pin recesses 316 spaced along the length on one side, and a non-pin portion 314 on the other side. Each of the first and second frame members 308, 309 may include, or have fixedly attached, along their lengths a first polarity magnetic strip 306.

Each locking mechanism 318 may include a pin 320 moveable between a first default position 324 (shown and described in relation to FIGS. 8A-8C) and a second position 326; a resilient member 322 configured to exert a pressure to keep the pin 320 in the first default position 324 until the pressure is overcome, and an actuator 328 configured to move the pin 320 into the second position in response to an unlock command. The actuators 328 may be selectively electrically connected to a power supply 330 through switch 334 by electrical links 332. The actuators 328 may move the pin 320 to the second position when the switch 334 is open thus providing electrical current to the actuator 328. The switch 334 may be communicatively connected to the controller 402, to receive lock and unlock commands from a coupling module 336. The coupling module 336 may include computer readable code written on a tangible computer readable media which when implemented by the processor 404 may cause lock and unlock commands to be generated to couple and uncouple the first satellite 106A and the second satellite 106B.

Referring now to FIG. 7B, the second side apparatus 340 may include a third frame member 344, and a fourth frame member 345 of the frame 200. The third frame member 344 may be located at along the length of the satellite 106B where the solar panel side 266 joins the second polarity side 272. The fourth frame member 345 may be located at along the length of the satellite 106B where the wave guide side 268 joins the second polarity side 272. Both the third frame member 344 and the fourth frame member 345 may include a raised portion 346 along the length of the frame member 344, 345. The raised portion 346 may be bordered along its' length by top recessed portion 348 on one side and a bottom recessed portion 350 on the other side. Each of the third and fourth frame members 344, 345 may include, or have fixedly attached, along their lengths a second polarity magnetic strip 342.

The raised portions 346 may include multiple lock recesses 352 spaced across the length of the third and fourth frame members 344, 346. The lock recesses 352 may be shaped such that the pin 320 of the first satellite 106A may extend into the lock recess 352 when the pin 320 is in the second position 326. The raised portions 346 may be shaped to fit within the channel 310 the first satellite 106A when the first and second satellites 106A, 106B are coupled. The lock recesses 352 may align with the pin recesses 316 when the first and second satellites 106A, 106B are coupled. The first polarity magnetic strip 306 and the second polarity magnetic strip 342 may be attracted to each other.

Referring now to FIG. 8A a cross section of the first frame member 308 of the first satellite 106A at one of the pin recesses 316 is illustrated. The pin 320 is shown in the first default position 324.

Referring now to FIG. 8B the same cross section of the first frame member 308 is illustrated with the pin 320 in the second unlocked position as the second satellite 106B approaches the first satellite 106A for coupling. A cross section of the third frame member 344 of the second satellite 106B at one of the locking recesses 352 is also illustrated. As the first and second satellites 106A, 106B approach each other for coupling, the raised portion 346 may line up with the channel 310 as the first polarity magnetic strip 306 and the second polarity magnetic strip 342 attract each other.

Referring now to FIG. 8C the same cross sections of the first and second satellites 106A, 106B are illustrated with the satellites 106A, 106B coupled. When the satellites 106A, 106B are coupled, the raised portion 346 may fit into the channel 310, the first polarity magnetic strip 306 and the second polarity magnetic strip 342 attract each other, and the pin 320 may be in the first default position 324, extending into the lock recess 352.

Referring now to FIGS. 9A and 9B, cross sections of the first satellite 106A along lines 9A and 9B of FIG. 7A, respectively, are illustrated showing a first side apparatus 354 of the second coupling apparatus 304. The first side apparatus 354 may be located on the first end 262 of the first satellite 106A. The first side apparatus 354 may include a first end cap 358, a raised shoulder element 362, a first polarity magnetic element 366, a first guide portion 370 of a guide 368, and a first locking portion 376 of a locking mechanism 374. The first end cap may include a bumper 360 which may be any type of resilient or other member which may cushion a collision between the first and second satellites 106A, 106B which may occur as coupling of the first and second satellites 106A, 106B is happening. The raised shoulder element 362 may include a circular disc shaped member with a center, and a recess aperture 364 with the same center, and be slightly recessed from the surface of the first end 262. The raised shoulder element 362 may include two or more pin recesses 316 beginning at the recess aperture 364 and radiating outward from the center. The first polarity magnetic element 366 may be located underneath or behind the raised shoulder element 362 such that it exerts a magnetic field through the recess aperture 364.

The guide 368 may provide a means by which the first end 262 of first satellite 106A, and the second end 264 of the second satellite 106B are guided to couple in a desired orientation. The guide 368 illustrated is exemplary and other guides 368 known in the art may be used. The first guide portion 370 may be two opposite protrusions from the raised shoulder element within the recess aperture 364. The locking mechanisms 374 may include a pin 320 locking mechanism similar to the one described in relation to FIGS. 7A and 7B. The electronics and actuators are not shown, as they are in those figures, but may be similar. The first locking portion 376 may include the pin recesses 316, and the pins 320 moveable between the first default position 324, as illustrated, and the second position 326 (shown in FIG. 11B). In the first default position, the pin extends into the recess aperture 364, or the lock recess 352 of the second satellite 106B as shown in FIG. 11C. In the second position, the pin 320 is contained within the pin recess 316.

Referring now to FIGS. 10A and 10B, cross sections of the second satellite 106B along lines 10A and 10B of FIG. 7B, respectively, are illustrated showing a second side apparatus 356 of the second coupling apparatus 304. The second side apparatus 356 may be located on the second end 264 of the second satellite 106B. The second side apparatus 356 may include a second end cap 380, a raised portion 382, a second polarity magnetic element 384, a second guide portion 372 of the guide 368, and a second locking portion 378 of the locking mechanism 374. The raised portion 382 may include a raised disc shaped member protruding from the second end 264 of the second satellite 106B, with at least two locking recesses 352 radiating outward from the center of the disc. The second polarity magnetic element 384 may be located within or underneath the raised portion 382 such that it exerts a magnetic field radiating from the raised portion 382.

The second guide portion 372 may include two opposite notches which the two protrusions of the first guide portion 370 may fit within when the first and second satellites 106A, 106B are coupled in the desired orientation. The second locking portion 378 may include the locking recesses 352, into which the pins 320 extend, when the satellites 106A, 106B are coupled and the pins 320 are in the first default position.

Referring now to FIG. 11A a cross section of the first end cap 358 of the first satellite 106A, is illustrated showing the first side apparatus 354 of the second coupling apparatus 304. The pin 320 is shown in the first default position 324.

Referring now to FIG. 11B the same cross section of the first end cap 358 is illustrated with the pins 320 in the second unlocked position as the second satellite 106B approaches the first satellite 106A for coupling. A cross section of the second end cap 380 of the second satellite 106B is also illustrated. As the first and second satellites 106A, 106B approach each other for coupling, the raised portion 382 may line up with the channel recess aperture 364 as the first polarity magnetic element 366 and the second polarity magnetic element 384 attract each other.

Referring now to FIG. 11C the same cross sections of the first and second satellites 106A, 106B are illustrated with the satellites 106A, 106B coupled. When the satellites 106A, 106B are coupled, the raised portion 382 may fit into the recess aperture 364, the first polarity magnetic element 366 and the second polarity magnetic element 384 attract each other, the pins 320 may be in the first default position 324, extending into the lock recesses 352, and the first guide portions 370 may be within the second guide portions 372.

Figure 12:
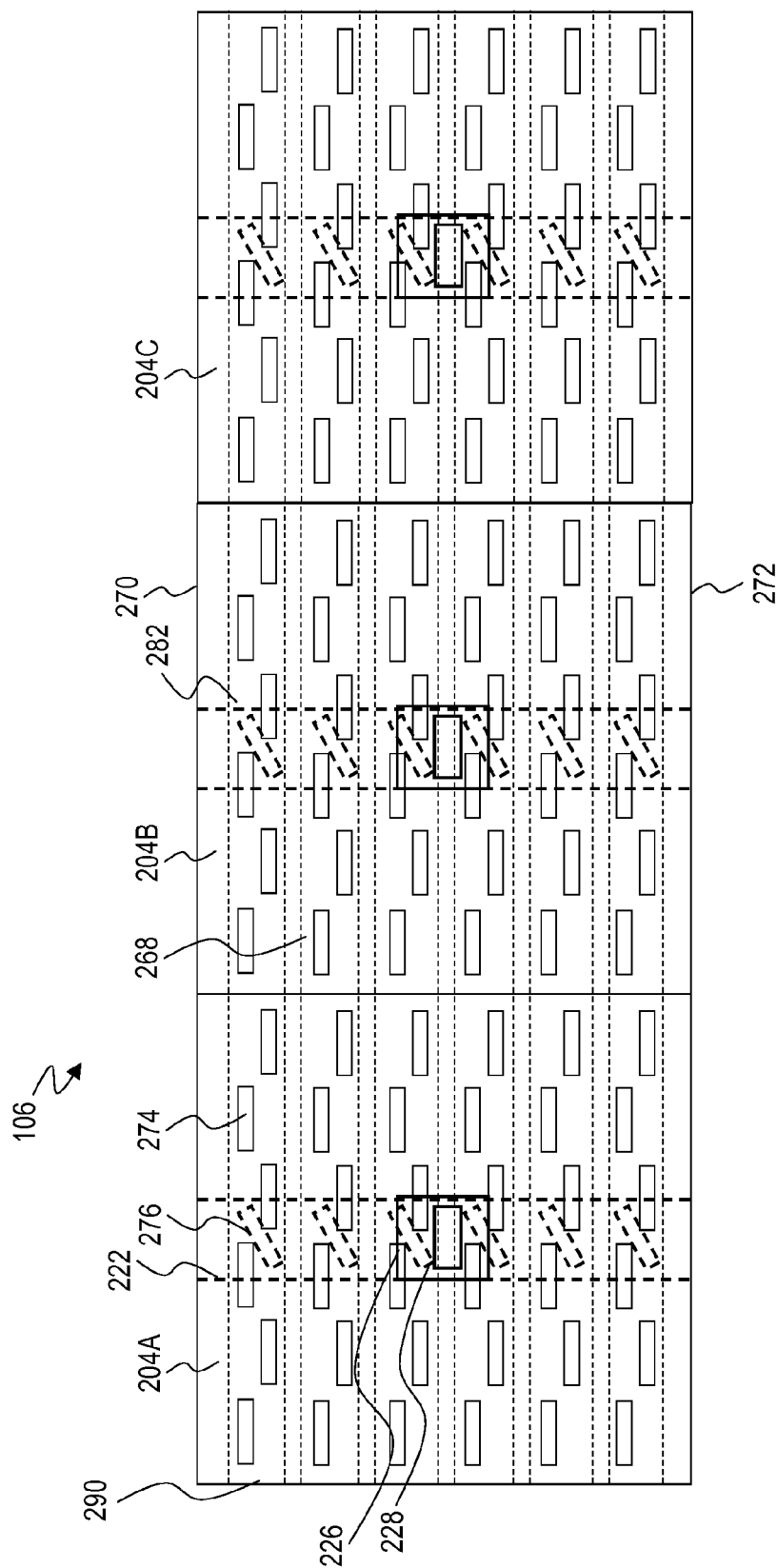
FIG. 12 is a front view of a wave guide side of the satellite including a wave guide antenna, wave guide feeder, and wave guide couplings and flanges, according to an exemplary embodiment of the invention.

Referring now to FIG. 12, the wave guide side 268 of the satellite 106 is illustrated. In the embodiment illustrated, the satellite 106 includes three wave guides 204A, 204B, 204C. Each wave guide 204 may include a planar array of wave guide slot openings 274 on a wave guide antenna 282, the wave guide feeder 222, the wave guide transmission coupling 224, the wave guide connection flange 226, the wave guide input flange 228, and the wave guide output flange 230 (224, 228, and 230 shown in and described in relation to FIG. 4). The wave guide antenna 282 and the slot openings 274 may be designed to guide electromagnetic waves of the same frequency as the magnetron 214 is designed to emit. Designing wave guides 204 for particular frequency ranges is known by ordinary persons skilled in the art. For example, the 2013 publication by Casula, G. A., Mazarella, G., and Montisci, G., entitled "Design of Shaped Beam Planar Arrays of Waveguide Longitudinal Slots", published in the International Journal of Antennas and Propagation, in Volume 2013, with Article ID 767342 discloses design methods and is incorporated in its' entirety by reference. In the example illustrated, each wave guide antenna 282 for a 1U cubesat includes six radiating wave guides 290 (or rows). Each radiating wave guide 290 includes six slots 274.

Referring now to FIG. 13, an exemplary embodiment of the control system 400 for controlling the satellite 106 is illustrated. The control system 400 may include the controller 402 for implementing command, control, and communication methods for the satellite 106, sensors 250 for generating signals indicative of properties and parameters of the satellite 106 and the satellite's environment, and satellite systems 424 which receive and implement signals and commands from the controller 402. Although illustrated as a single control system, the control system 400 may be comprised of components of several systems which are commercially available separately.

The controller 402 may include one or more electronic devices communicatively and operatively connected. The controller 402 may include the processor 404, which may include one or more processors, such as micro-processors, which may implement computer readable code to control the satellite 106, such as computer readable code to implement methods shown and described in relation to FIGS. 14A-18D. The computer readable code may be written on tangible computer readable media which may include one or more memory components 406. The one or more memory components 406 may include memory components associated with the de-orbiter module 244, the power distribution module 248, the coupling module 336, a navigation module 408, a coupling module 410, and a targeting module 412. The navigation module 408 may include computer readable code which when implemented by the processor 404 may generate navigation signals to navigate and position the satellite 106. The coupling module 410 may include computer readable code which when implemented by the processor 404 may generate coupling signals to couple the first satellite 106A with the second satellite 106B, and/or create an array 220. The targeting module 412 may include computer readable code which when implemented by the processor 404 may generate targeting signals to position and control the satellite 106 to send the microwave energy 110 to the rectenna 118. The controller 402 may include one or more receivers 414 and one or more transmitters 416 to communicate with the command station 114, the GPS satellite 108, other satellites 106, or other locations to implement methods shown and described in relation to FIGS. 14A-18D.

The sensors 250 may include the entire or components of the attitude detector and control 218, the differential absorption detection and ranging module 238, the sun sensor 252, the earth sensor 254, the magnetometer 256, the gyroscope 258, the star tracker 260, a power supply sensor 418, and/or other sensors 420. The power supply sensor 418 may be configured to measure the power stored in the power storage unit 210 and generate a signal indicative of the power stored. The sensors 250 may be communicatively connected to the controller 402 through communication links 422.

The satellite systems 424 may include, but are not limited to, the entire or components of the attitude detector and control 218, the electric power system 246, the differential absorption detection and ranging module 238, and the coupling system 300.

Figure 14A:
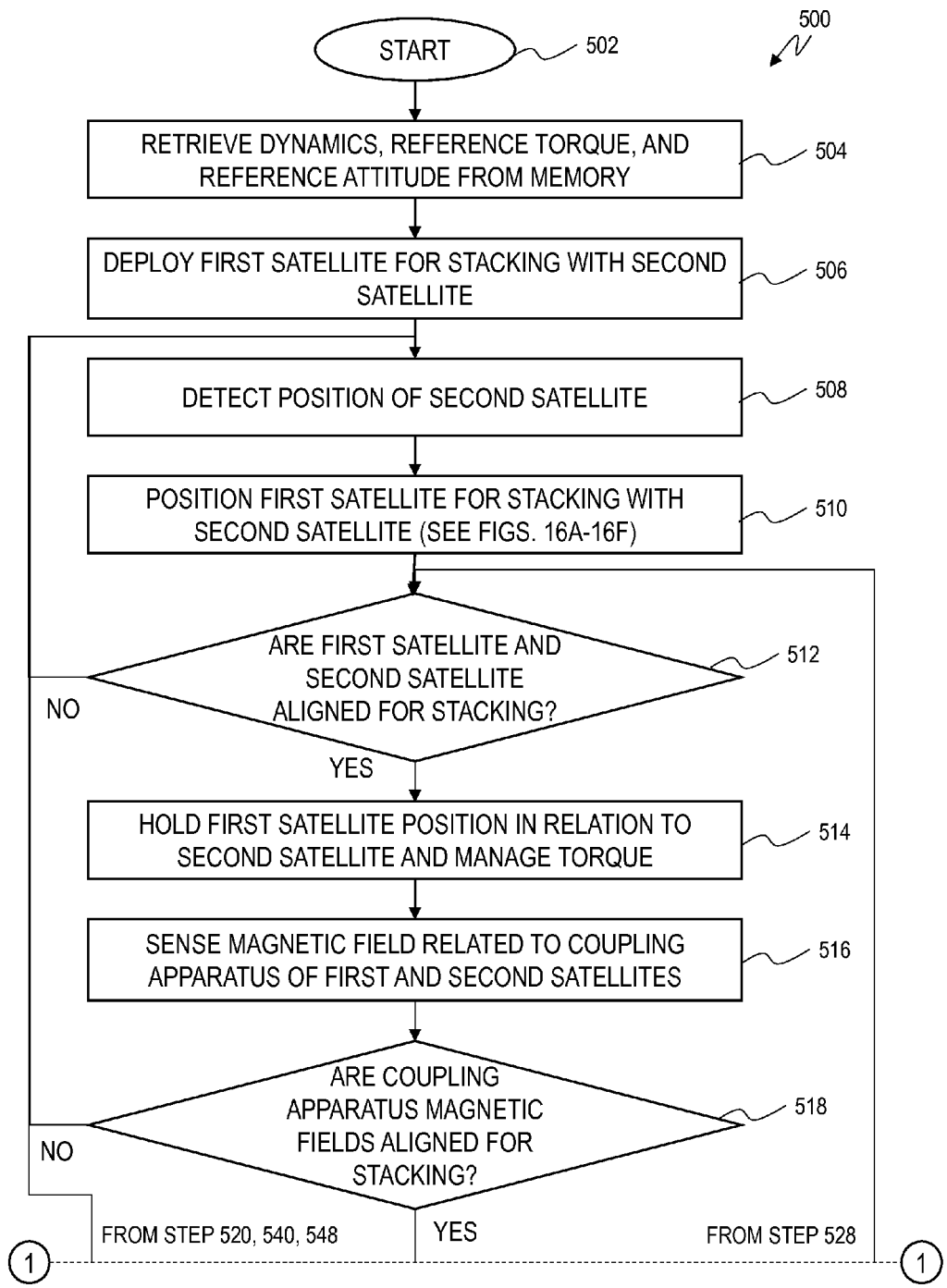
FIG. 14A is a flow chart of a first portion of a method for coupling a first satellite with a second satellite according to an exemplary embodiment of the invention.

Referring now to FIG. 14A, a flow chart of a first portion of an exemplary method 500 for coupling the first satellite 106A with the second satellite 106B is illustrated. Control in method 500 may be from the command station 114, one or more of the satellites 106, and/or both. Commanding movements of satellites, and internal functions of satellites from ground command stations, internal controls systems of satellites, and/or a combination is known by ordinary persons skilled in the art. The following description does not specify which control systems send and receive which signals, and it should be assumed that one or more controllers located ground command station 114, the satellite 106, or a combination of both send and receive signals to implement the method 500 as is known in the art. The method starts at 502. The dynamics, reference torque, and reference attitude may be retrieved from a memory component 140, 406 (step 504). The first satellite 106A may then be deployed for stacking. This may be done when the first satellite 106A is first deployed into space, or it may be done at a later time (step 506). The position of the second satellite may be determined (step 508). The first satellite 106A may be positioned for stacking with the second satellite 106B by moving the first satellite 106A, and/or the second satellite 106B. Navigation and positioning methods for the satellite 106 are shown and described in relation to FIGS. 16B-16F (step 510).

It may be determined if the first and second satellite 106A, 106B are aligned for stacking, the position of the first satellite 106A may be held in relation to the second satellite 106B and the torque of both satellites 106A, 106B may be managed (steps 512, 514). If the first and second satellite 106A, 106B are not aligned for stacking, the method 500 may return to step 508 to correct this (step 512). The strength of the magnetic fields created by the magnetic strips 306, 342, and/or the magnetic elements 366, 384 may be sensed by both satellites 106A, 106B (step 516). The magnetometer may sense the direction of the magnetic fields created by the magnetic strips 306, 342, and/or the magnetic elements 366, 384, and it may be determined if the magnetic fields are aligned such that coupling of the satellites 106A, 106B may occur, at least in part, in response to signals from the magnetometer 256 (step 518). If the magnetic fields are not aligned for coupling of the satellites 106A, 106B, the method 500 may return to step 508. If the magnetic fields are aligned for coupling of the satellites 106A, 106B, the method 500 may continue to steps in FIG. 14B.

Figure 14B:
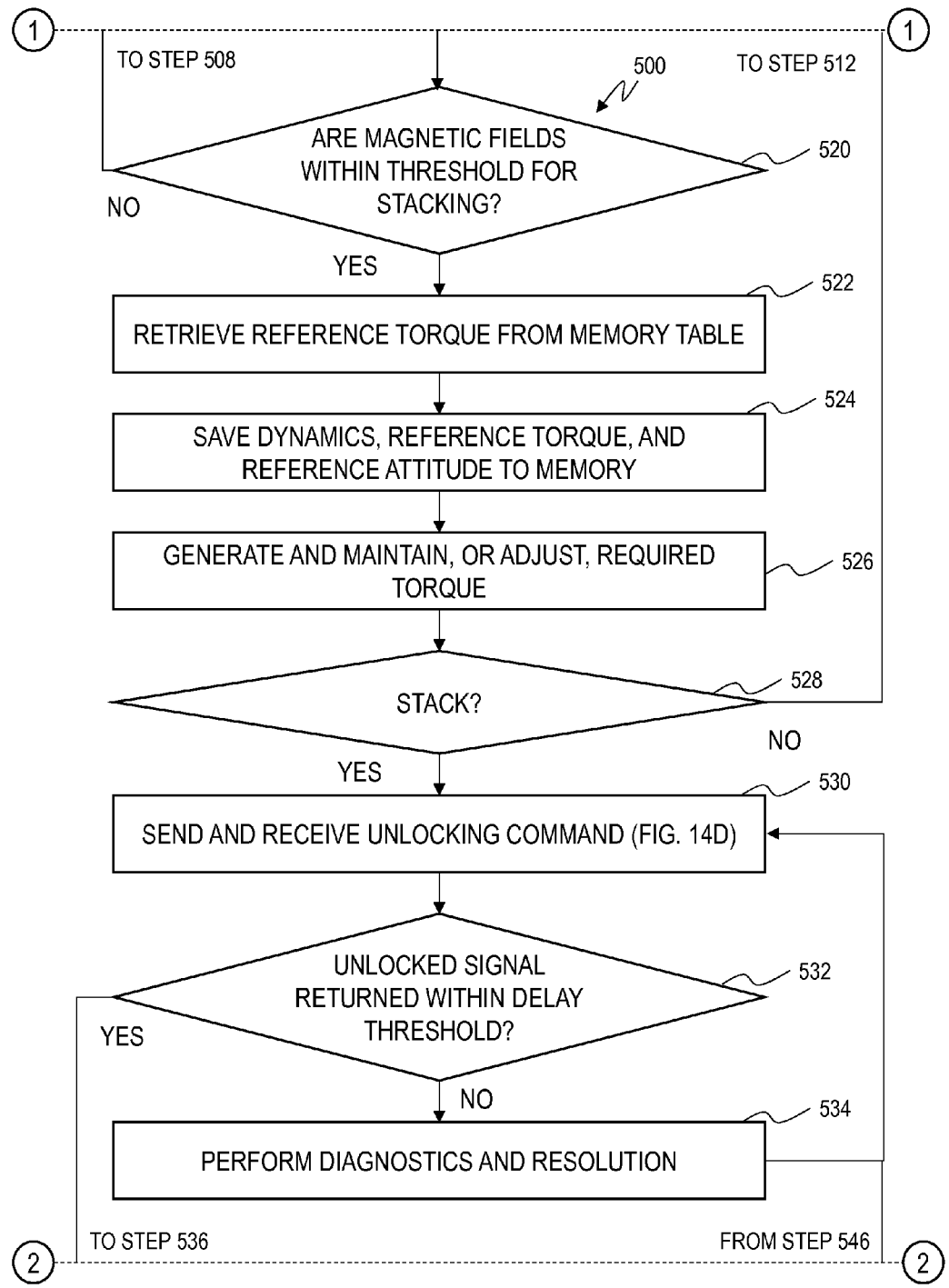
FIG. 14B is a flow chart of a second portion of the method for coupling a first satellite with a second satellite of FIG. 14A.

Referring now to FIG. 14B, a second portion of an exemplary method 500 for coupling a first satellite with a second satellite is illustrated with a flow chart. The magnetometer may sense the strength of the magnetic fields created by the magnetic strips 306, 342, and/or the magnetic elements 366, 384, and it may be determined if the magnetic fields are within a predetermined strength threshold such that coupling of the satellites 106A, 106B may occur, at least in part, in response to signals from the magnetometer 256 (step 520). If the magnetic fields are not within the predetermined strength threshold, the method 500 may return to step 508 (FIG. 14A). If the magnetic fields are within the predetermined strength threshold, the reference torque may be retrieved from the memory component 140, 406 for one or both satellites 106A, 106B (step 522), current dynamics, reference torque, and reference attitude may be saved to a memory component 140, 406 (step 524), and the torque to maintain or adjust the satellites 106A, 106B position to stack may be generated (step 526).

It may be determined that if the satellites 106A, 106B may now stack (step 528). If the satellites 106A, 106B are not in position to stack, the method 500 returns to step 512 (FIG. 14A). If the satellites 106A, 106B are in position to stack, an unlocking command is sent and received (step 530). An exemplary method for sending and receiving the unlocking command is shown and described in relation to FIG. 14D. When the unlocking command is received, an acknowledgement of the receipt may be sent within a predetermined delay threshold (step 532). If the acknowledgement is not sent within the predetermined threshold, diagnostics may be performed and a resolution reached (step 534). Once the resolution is reached, the method 500 may return to step 530. If the acknowledgement is sent within the predetermined threshold, the method 500 may continue to steps in FIG. 14C.

Figure 14C:
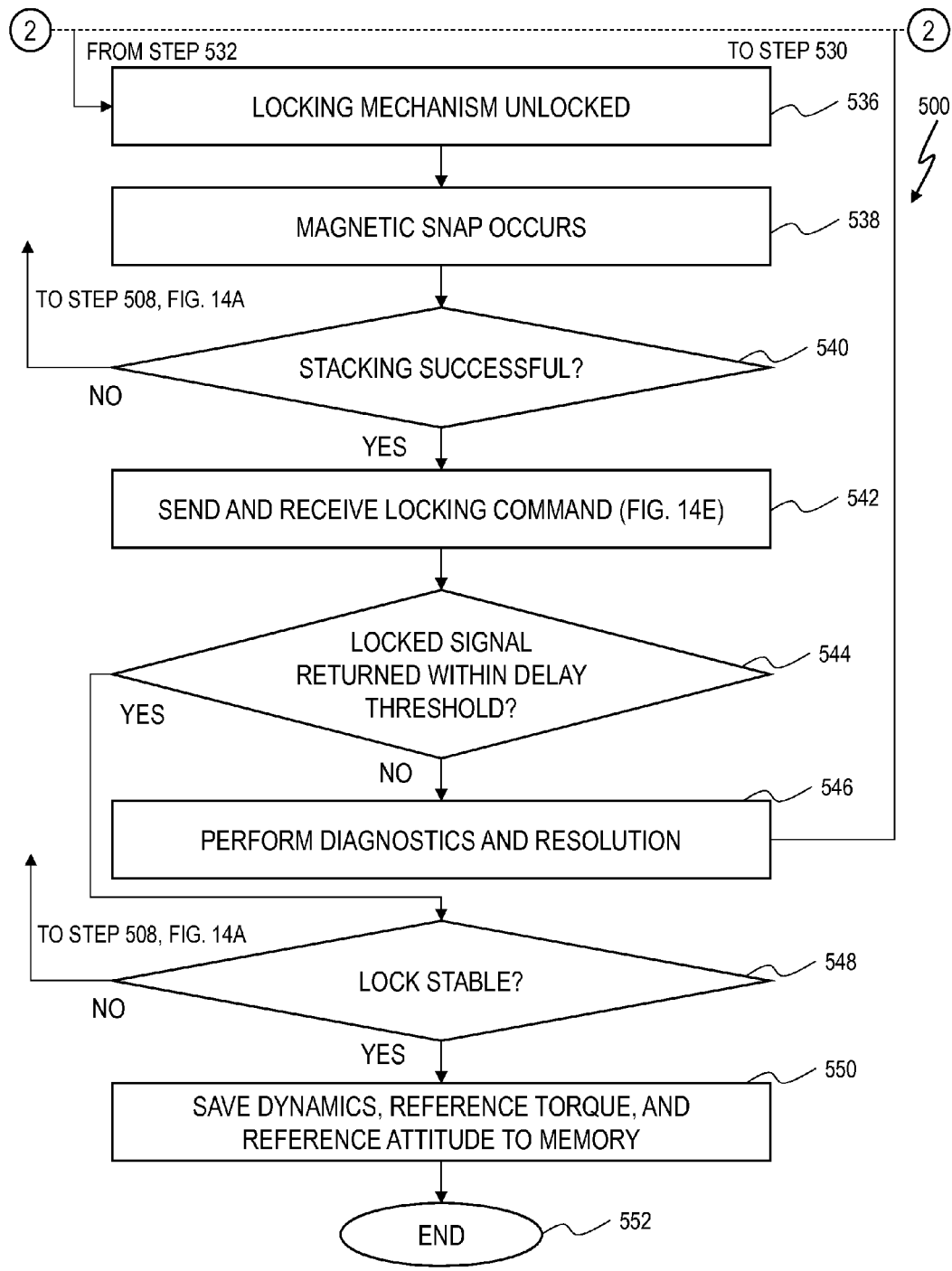
FIG. 14C is a flow chart of a third portion of the method for coupling a first satellite with a second satellite of FIGS. 14A and 14B.

Referring now to FIG. 14C, a third portion of an exemplary method 500 for coupling a first satellite with a second satellite is illustrated with a flow chart. The locking mechanisms 318 may unlock in response to the unlock signal. In one embodiment, the coupling module 336 may generate a unlock signal and electric current may flow from the power supply 330, through the electrical links and the switch 334, and to the actuators 328. The pins 320 may move to the second position 326 (step 536). A magnetic snap may then occur as the magnetic strips 306, 342, and/or the magnetic elements 366, 384 of the first and second satellites 106A, 106B pull together (step 538). It may be determined if the stacking was successful (step 540). If the stacking was not successful, the method 500 may return to step 508 (FIG. 14A). If the stacking was successful, a locking command may be sent and received (step 542). An exemplary method for sending and receiving a locking command is shown and described in relation to FIG. 14E.

When the locking command is received, an acknowledgement of the receipt may be sent within a predetermined delay threshold (step 544). If the acknowledgement is not sent within the predetermined threshold, diagnostics may be performed and a resolution reached (step 546). Once the resolution is reached, the method 500 may return to step 530. If the acknowledgement is sent within the predetermined threshold, it may be determined if the lock is stable, and, in one embodiment, that the pins 320 have moved to the first default position 324 where they extend into the locking recesses 352 (step 548). If the lock is not stable, the method 500 may return to step 508 in FIG. 14A. If the lock is stable, the dynamics, reference torque, and reference attitude of the satellite 106A, 106B may be saved to a memory component 140, 406 (step 550). The method 500 ends at step 552.

Figure 14D:
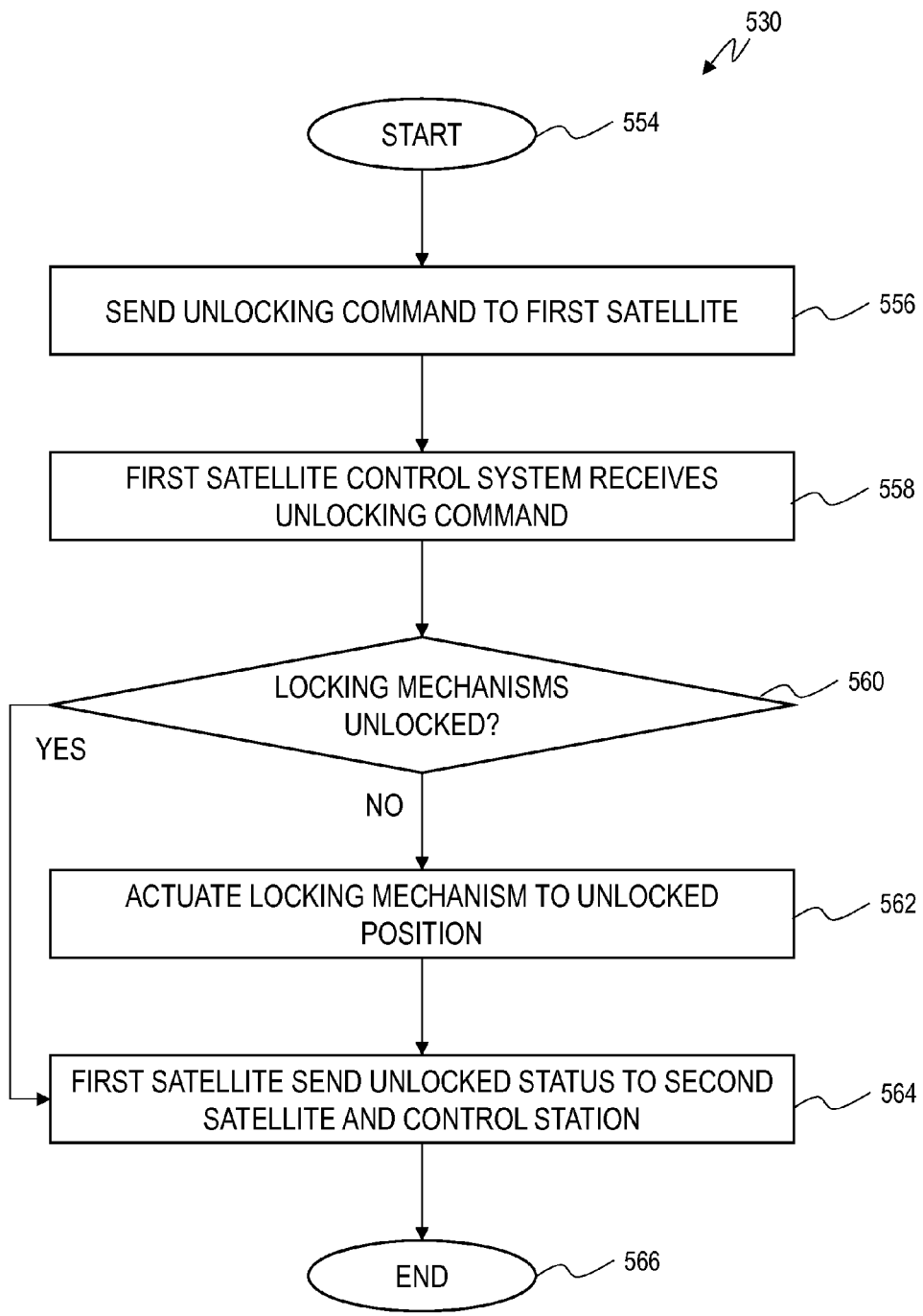
FIG. 14D is a flow chart of a fourth portion of the method for coupling a first satellite with a second satellite of FIGS. 14A, 14B, and 14C.

Referring now to FIG. 14D, a fourth portion of an exemplary method 500 for coupling a first satellite with a second satellite is illustrated with a flow chart. In particular an embodiment of step 530, an exemplary method of sending and receiving an unlocking command is further illustrated. The method begins at step 554. An unlocking command may be sent to the first satellite 106A by the command station 114, and received by the first satellite 106A (steps 556, 558). It may be determined if the locking mechanisms 318 are unlocked (in the embodiment in FIGS. 7A-11C, if the pins 320 are in the second position) (step 560). If the locking mechanisms 318 are not unlocked, the locking mechanisms 318 may be actuated to an unlocked position (step 562). If the locking mechanisms 318 are in the unlocked position, or if they have been actuated to the unlocked position, the first satellite 106A may send an unlocked status message to the second satellite 106B, and/or the command station 114 (step 564). The method ends at step 566.

Figure 14E:
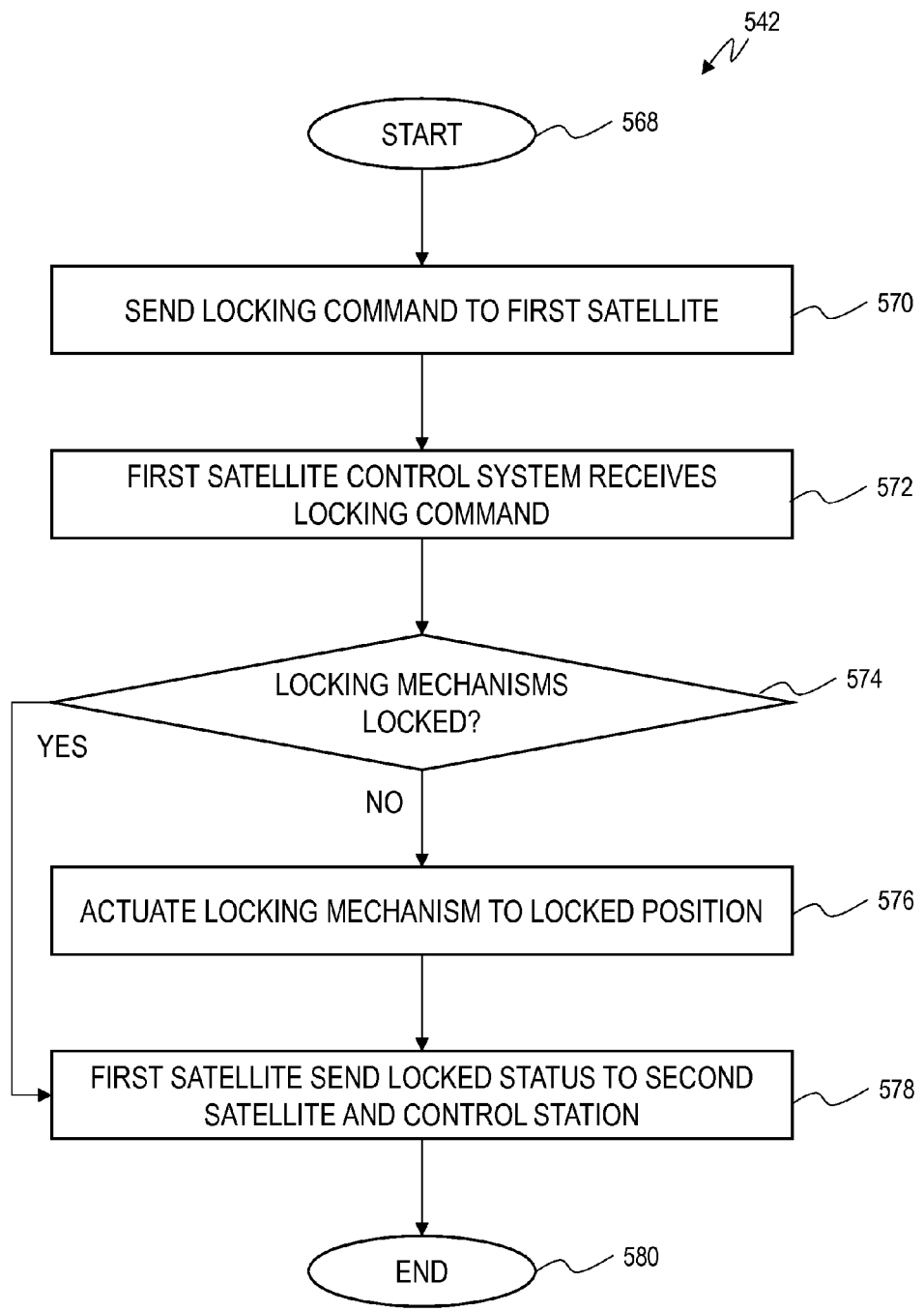
FIG. 14E is a flow chart of a fifth portion of the method for coupling a first satellite with a second satellite of FIGS. 14A, 14B, 14C and 14D.

Referring now to FIG. 14E, a fifth portion of an exemplary method 500 for coupling a first satellite with a second satellite is illustrated with a flow chart. In particular an embodiment of step 542, an exemplary method of sending and receiving a locking command is further illustrated. The method begins at step 568. A locking command may be sent to the first satellite 106A by the command station 114, and received by the first satellite 106A (steps 570, 572). It may be determined if the locking mechanisms 318 are locked (in the embodiment in FIGS. 7A-11C, if the pins 320 are in the first default position) (step 574). If the locking mechanisms 318 are not locked, the locking mechanisms 318 may be actuated to a locked position (step 576). If the locking mechanisms 318 are in the locked position, or if they have been actuated to the locked position, the first satellite 106A may send a locked status message to the second satellite 106B, and/or the command station 114 (step 578). The method ends at step 580.

Figure 15:
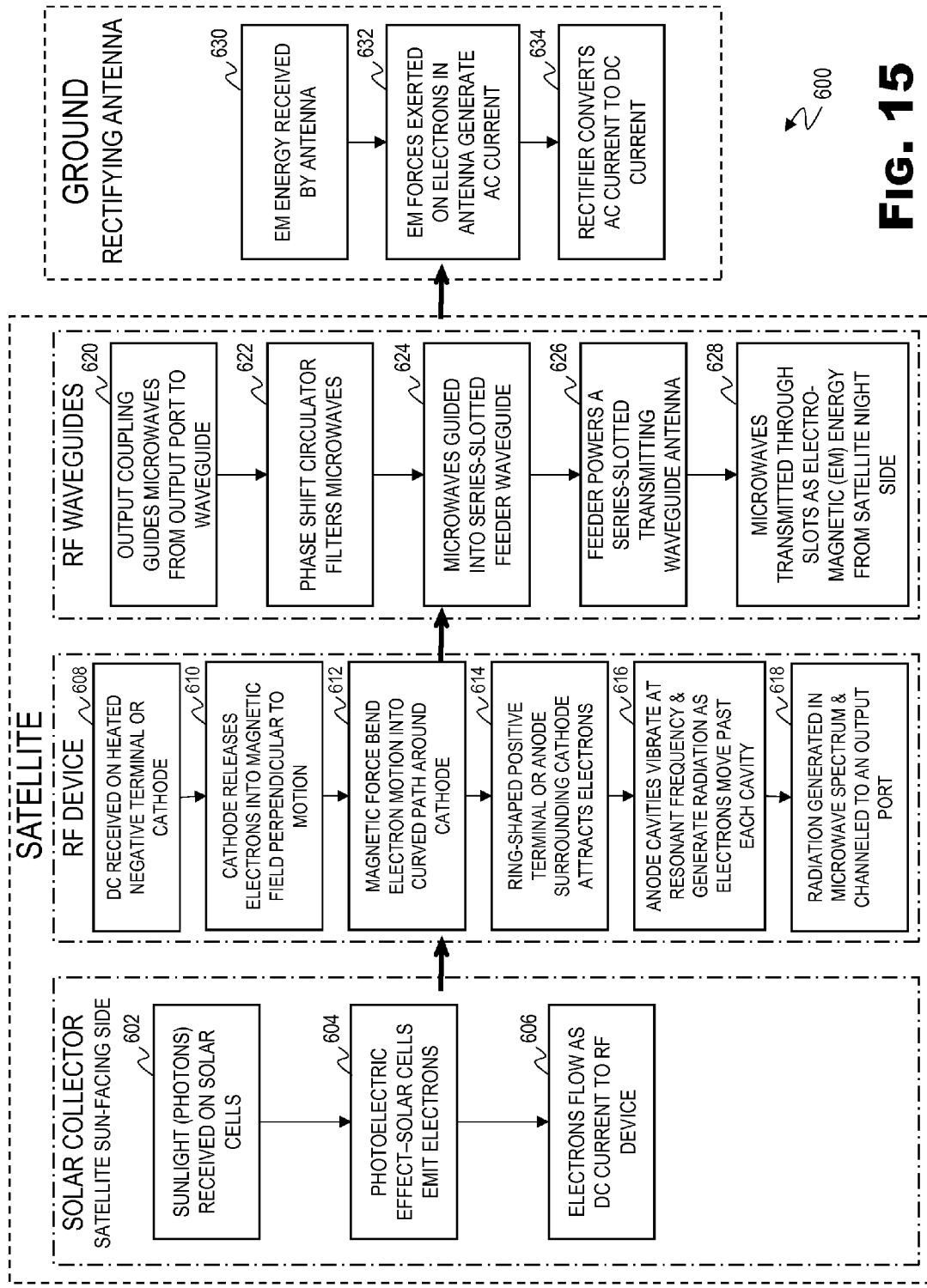
FIG. 15 is a flow chart and schematic of a method for energy conversion according to an exemplary embodiment of the invention.

Referring now to FIG. 15, and exemplary method 600 for energy conversion is shown in a flow chart and schematic. The method 600 begins at step 602. The satellite 106 and/or array may be positioned such that the solar panels 202 face the sun 102. Sunlight or photons from the sun 102 may be received on solar cells in the solar panels 202. The solar cells may emit electrons as a result of the photoelectric effect, as is known in the art (step 604). The electrons may flow as DC current to an RF device, which may include the magnetron 214 (step 606).

The DC current may be received on a heated negative terminal of the RF device (magnetron 214), which may include the cathode tube 232 (step 608). The cathode tube 232 may release electrons into a magnetic field in the magnetron 214 perpendicular to the motion of the electrons (step 610). The magnetic force from the magnetic field may bend the electron's path into a curved path around the cathode tube 232 (step 612). The magnetron 214 may include a ring-shaped positive terminal, or anode, surrounding the cathode, which may attract the electrons (step 614). The anode may include multiple cavities, which may vibrate at resonant frequencies, and generate radiation as the electrons move past each cavity (step 616). The radiation generated may be in the microwave spectrum. Specifically, the radiation may be between five and nineteen gigahertz (5-19 GHz). The dimensions and design of the magnetron 214 may determine the radiation frequency (step 618). Generating microwave radiation with a magnetron 214 is known in the art.

The microwaves may be guided from the magnetron 214 through the wave guide output flange 230 (step 620). A phase shift circulator may filter the microwaves (step 622). The microwaves may be guided into a series-slotted feeder guide waveguide which may include the wave guide feeder 222 (step 624). The wave guide feeder 222 may power the wave guide antenna 282 which may include a series slotted transmitting waveguide antenna (step 626). The microwaves may be transmitted through the slots as electromagnetic (EM) energy 110 from the wave guide side 268 of the satellite 106 and/or array 220, which may be aligned to face the earth (step 628).

The satellite 106 and/or array 220 may be aligned such that a majority of the microwave energy 110 is received by the rectenna 118 (step 630). The EM forces exerted on the electrons in the rectenna 118 by the microwave energy 110 may generate an AC electric current (step 632). The AC current may be rectified to generate DC current which may be transmitted for use in powering the load 134 or used for other purposes.

Figure 16A:
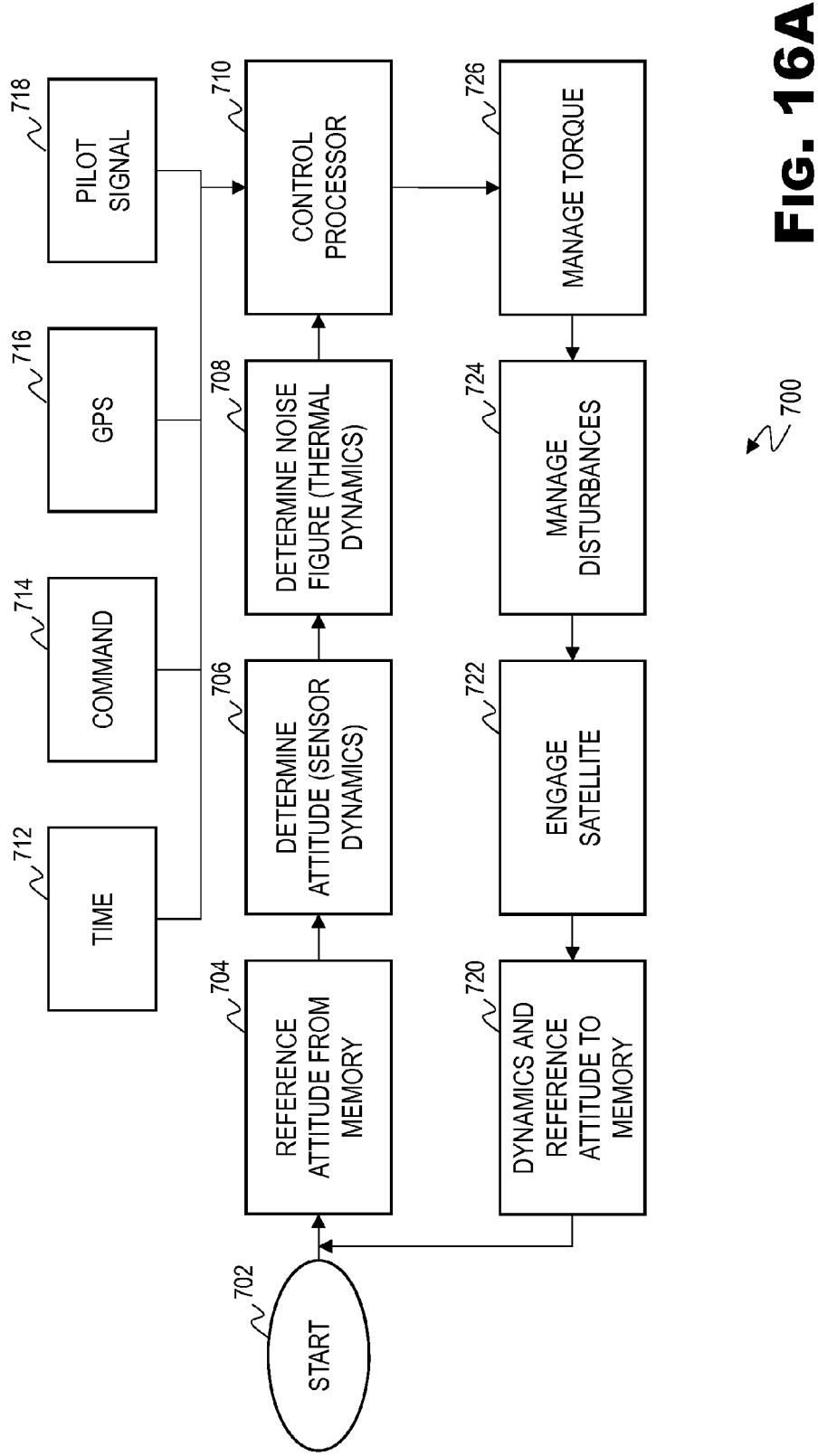
FIG. 16A is a flow chart of a first portion of a method for navigational and positional control of a satellite according to an exemplary embodiment of the invention.

Referring now to FIG. 16A, an exemplary method 700 for navigational and positional control of the satellite 106 is shown in a flow chart of a control loop. FIGS. 16B-16F breaks the steps shown in FIG. 16A down into further exemplary steps. Each satellite 106 may be positioned in the desired orbit at the desired attitude such that the solar panels 202 are facing the sun 102, the wave guide antennas 282 are facing the earth, and the microwave energy 110 is targeted such that the majority of the energy reaches the rectenna 118. The satellites 106 may also be moved into positions to couple with other satellites 106 to form the array 220. The method starts at 702. The satellite 106 may save the attitude of the satellite 106 at regular intervals, and/or in response to certain events or commands. The controller 402 may reference the last saved attitude of the satellite 106 (step 704). The controller 402 may determine the current attitude of the satellite 106. Sensor readings from, for example, the sun sensor, the earth sensor, and the star tracker may be used to determine the satellite's attitude (step 706).

The controller 402 may determine a noise figure for the satellite 106. The noise figure may indicate forces in the satellite's environment which may act on the satellite 106 and may change the satellite's position and/or attitude, which the satellite 106 may have to counter to stay in a desired position, in a desired attitude. The satellite may detect these forces through the magnetometer 256, a temperature sensor, and/or other sensors known in the art (step 708).

The controller 402 may have an atomic clock with which to ensure that signals sent and received are time synchronized (step 712) The controller 402 may receive navigational and positional commands from the command station 114. These commands may be received directly from the command station 114, or may be relayed by other satellites 106 (step 714). The satellite 106 may send and receive signals from one or more GPS satellites 108 which may provide a check on the satellite's position 106. GPS satellites may also be utilized to transmit signals from the command station 114. Using GPS satellites 108 to check position, and relay signals to satellites is known in the art (step 716). The controller 402 may detect and receive two pilot signals at two different frequencies from the rectenna 118, for targeting purposes (step 718).

The controller 402 may manage torque, manage disturbances, and engage the satellite, at least in part, in response to the reference attitude, the current attitude, the noise figure, time synchronization, commands received, GPS communications, and the pilot signals (step 710). The controller 402 may determine how much torque is needed to move the satellite 106 into the desired attitude and position (step 726). The determination of the amount of torque needed to move the satellite 106 into the desired position and attitude may take into account disturbances indicated in the noise figure (step 724). The controller 402 may generate commands to, for example, the 3-axis reaction wheel to produce the desired torque amount in the desired direction (step 722). The controller 402 may save the dynamics and reference attitude to the memory component 406 at regular intervals (step 720).

Figure 16B:
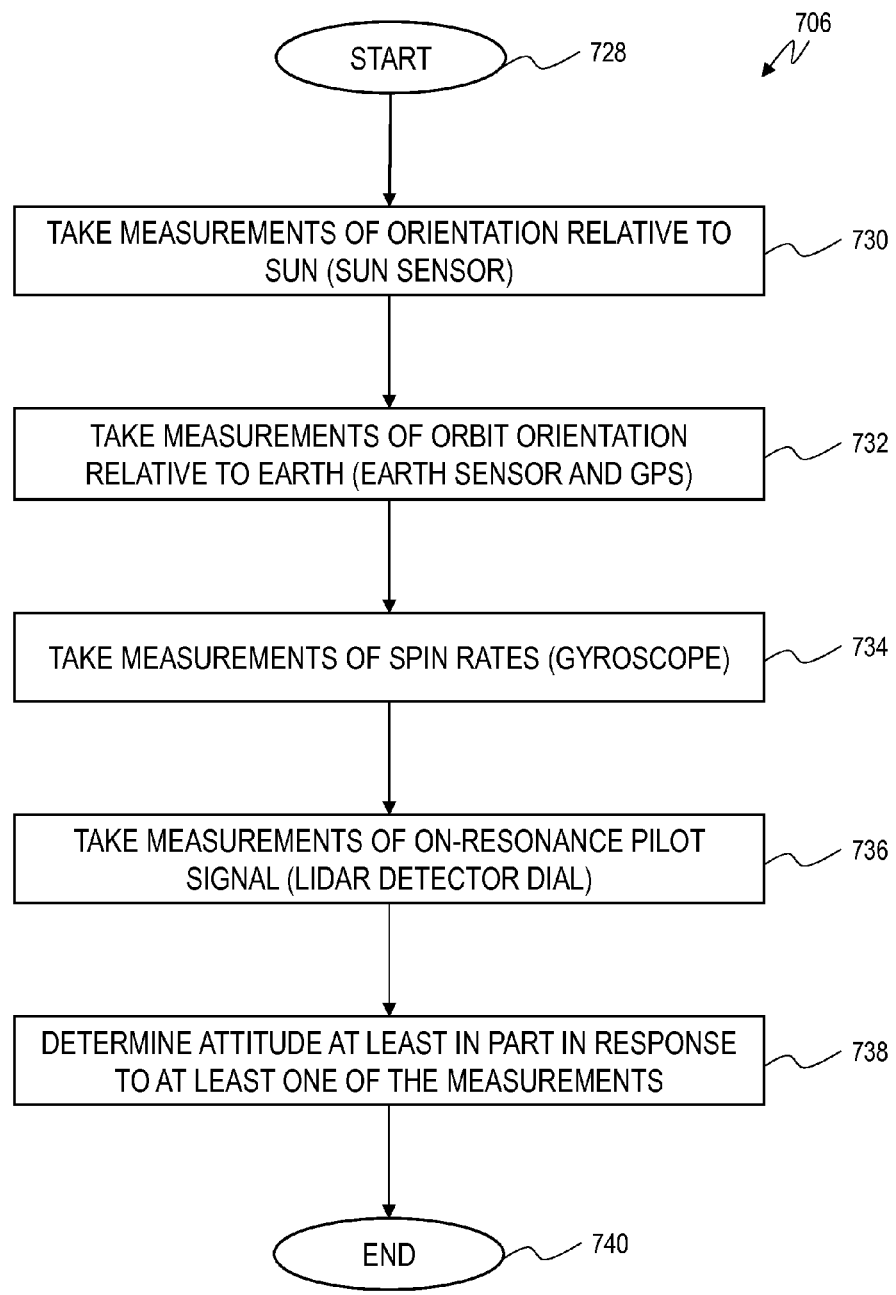
FIG. 16B is a flow chart of a second portion of the method for navigational and positional control of a satellite of FIG. 16A.

Referring now to FIG. 16B, a second portion of the exemplary method 700 for navigational and positional control of a satellite is illustrated with a flow chart. In particular an embodiment of step 706, an exemplary method of determining the current attitude of a satellite is illustrated. The method starts at 728. The controller 402 may receive signals from the sun sensor 252 indicative of the position of the satellite 106 in relation to the sun 102 (step 730). The controller 402 may receive signals from the earth sensor 254 and the GPS satellite 108 indicative of the orientation of the satellite's 106 orbit relative to the earth (step 732). The controller 402 may receive signals from the gyroscope 258 indicative of the spin rates of the satellite 106 (step 734). The controller 402 may receive signals from the DIAL 238 indicative of the attitude and position of the satellite 106 in relation to the rectenna 118 (step 736). The controller 402 may determine the attitude and/or position of the satellite 106, at least in part, in response to at least one of the signals received from the sun sensor 252, the earth sensor 254, the GPS satellite 108, the gyroscope 258, and the DIAL 238 (step 738). The method ends at 740.

Figure 16C:
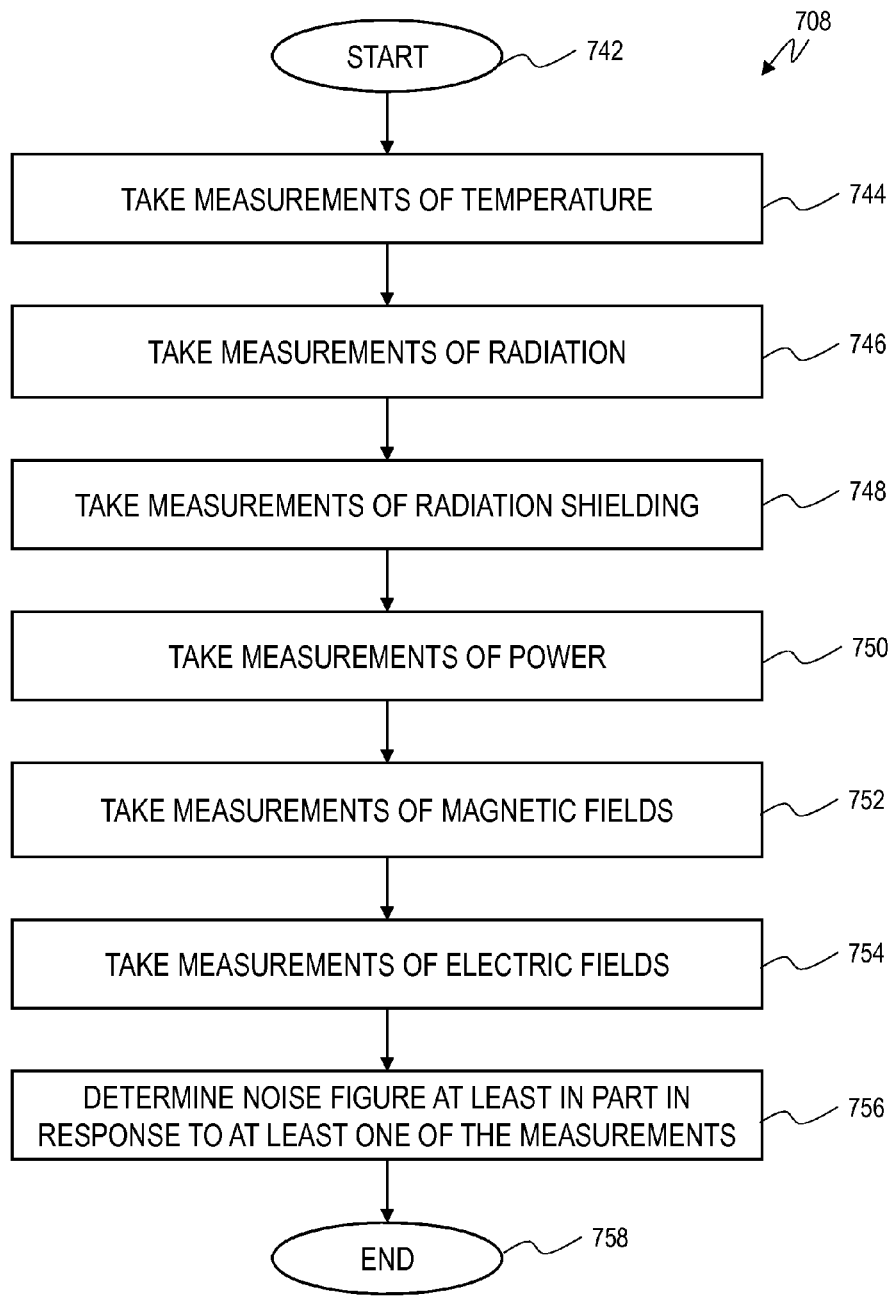
FIG. 16C is a flow chart of a third portion of the method for navigational and positional control of a satellite of FIGS. 16A and 16B.

Referring now to FIG. 16C, a third portion of the exemplary method 700 for navigational and positional control of a satellite is illustrated with a flow chart. In particular an embodiment of step 708, an exemplary method of determining the noise figure of a satellite is illustrated. The method begins at step 742. The controller 402 may receive signals indicative of temperature surrounding or internal to the satellite 106 from, for example, a temperature sensor (step 744). The controller 402 may receive signals indicative of radiation in the environment surrounding the satellite 106, the surface of the satellite 106, and/or internal to the satellite 106, from one or more radiation sensors as known in the art (step 746). The controller 402 may receive signals indicative of radiation shielding (step 748), and power (step 750) from sensors as known in the art. The controller 402 may receive signals indicative of magnetic field strength and direction, from, for example, the magnetometer 256 (step 752). The controller 402 may receive signals indicative of the strength and direction of electric fields from sensors as known in the art (step 754). The controller 402 may determine the noise figure, at least in part, in response to at least one of the signals indicative of temperature, radiation, radiation shielding, power, magnetic fields, and electric fields (step 756). The method ends at step 758.

Figure 16D:
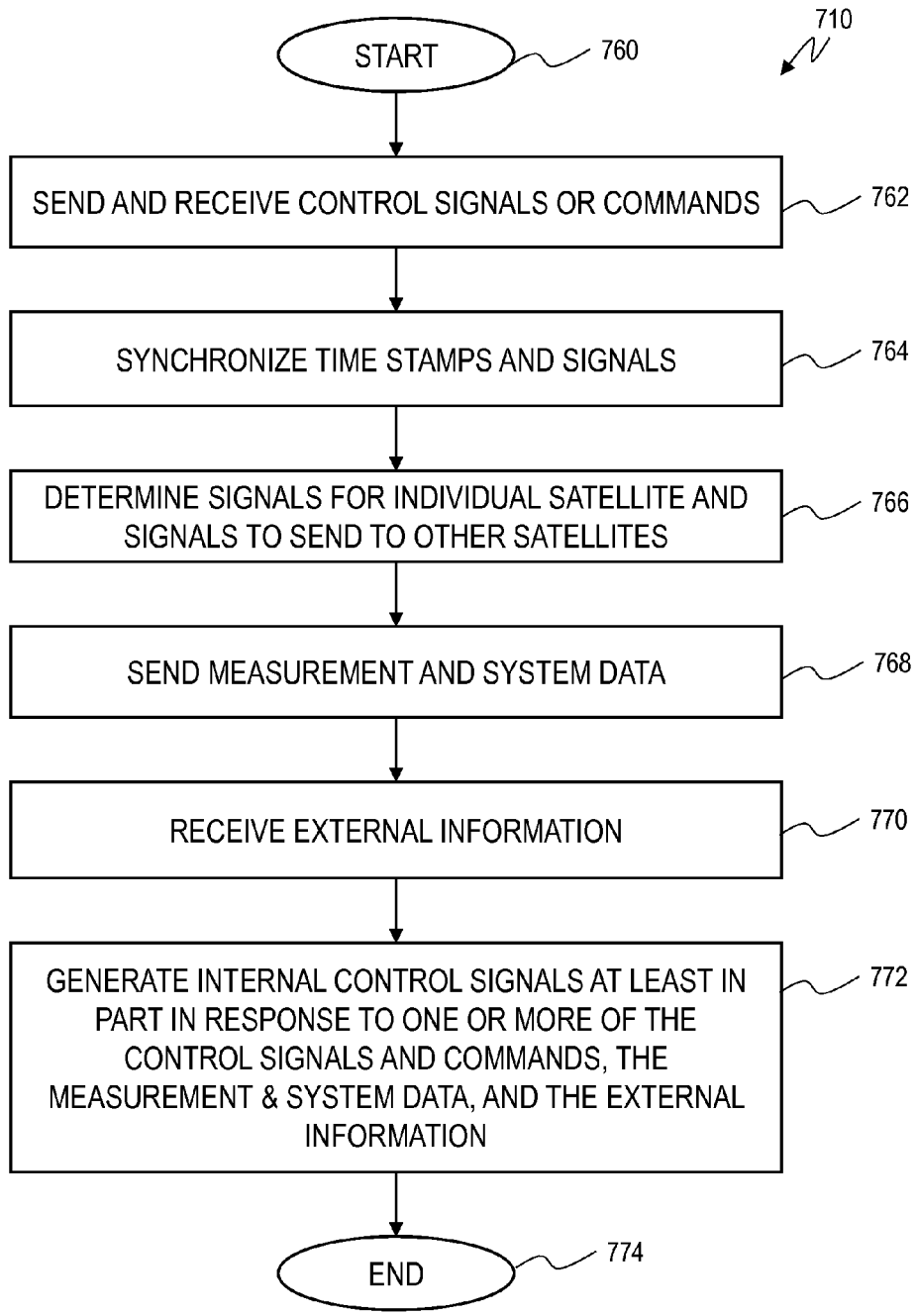
FIG. 16D is a flow chart of a fourth portion of the method for navigational and positional control of a satellite of FIGS. 16A, 16B, and 16C.

Referring now to FIG. 16D, a fourth portion of the exemplary method 700 for navigational and positional control of a satellite is illustrated with a flow chart. In particular an embodiment of step 710, an exemplary method of generating commands from the controller 402 is illustrated. The method starts at step 760. The controller 402 may send signals to, and receive signals from, the command station 114, other satellites 106, and/or GPS satellites 108 step 762). The controller 402 may synchronize the time stamps on messages sent and received (step 764). Messages sent to the controller 402 of an individual satellite 106 may not be for that particular satellite 106. Each message may be encrypted, and may include the IP address or other identifier of the satellite 106 it is intended for. Some messages or signals may not be for any of the satellites 106. The controller 402 may determine which messages are meant for that satellite 106, and may also determine messages which the controller 402 is meant to pass on to other satellite 106 in the array 220 (step 766). The controller 402 may send one or messages to the command station 114, directly or through another satellite 106, with the measurement data collected in steps 706 and 708 (step 768). The controller 402 may receive information from the command station 114, the GPS satellite 108, and/or other satellites 106 (step 770). The controller 402 may generate internal control signals, at least in part, in response to at least one of the control signals and commands, the measurement and system data, and the external information (step 772). The method ends at step 774.

Figure 16E:
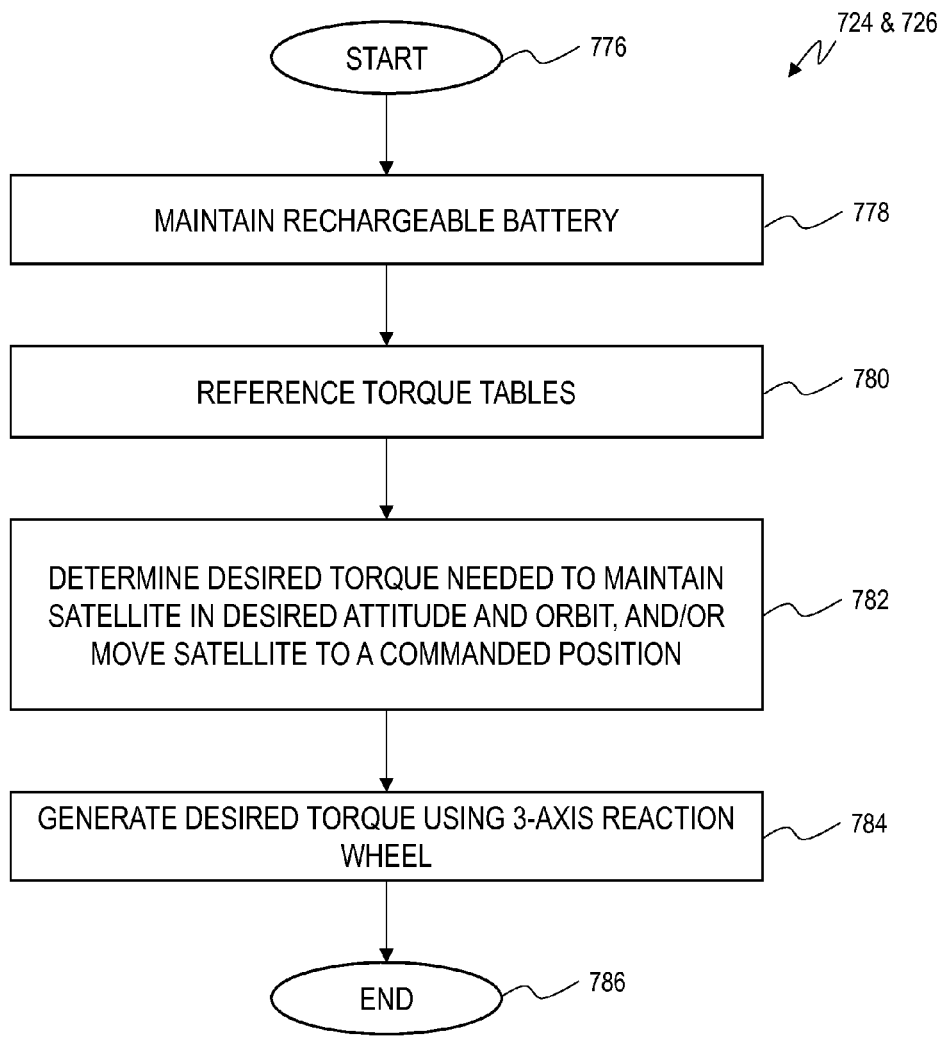
FIG. 16E is a flow chart of a fifth portion of the method for navigational and positional control of a satellite of FIGS. 16A, 16B, 16C, and 16D.

Referring now to FIG. 16E, a fifth portion of the exemplary method 700 for navigational and positional control of a satellite is illustrated with a flow chart. In particular an embodiment of steps 724 and 726, an exemplary method of managing the torque and disturbances is illustrated. The method begins at step 776. The power distribution module 248 may control the amount of power directed to the power storage unit 210 to ensure that there is always sufficient power available for the satellite 106 to perform essential functions, and to separate the satellite 106 from other satellites 106 and safely deorbit, should that become necessary (step 778). The controller 402 may reference torque tables in the memory component 406 to determine what torque is needed to maintain the satellite 106 in the desired attitude and orbit, and/or move the satellite 106 to a commanded position (steps 780, 782). The controller 402 may send command signals to the 3-axis reaction wheel produce the desired torque (step 784). The method ends at step 786.

Figure 16F:
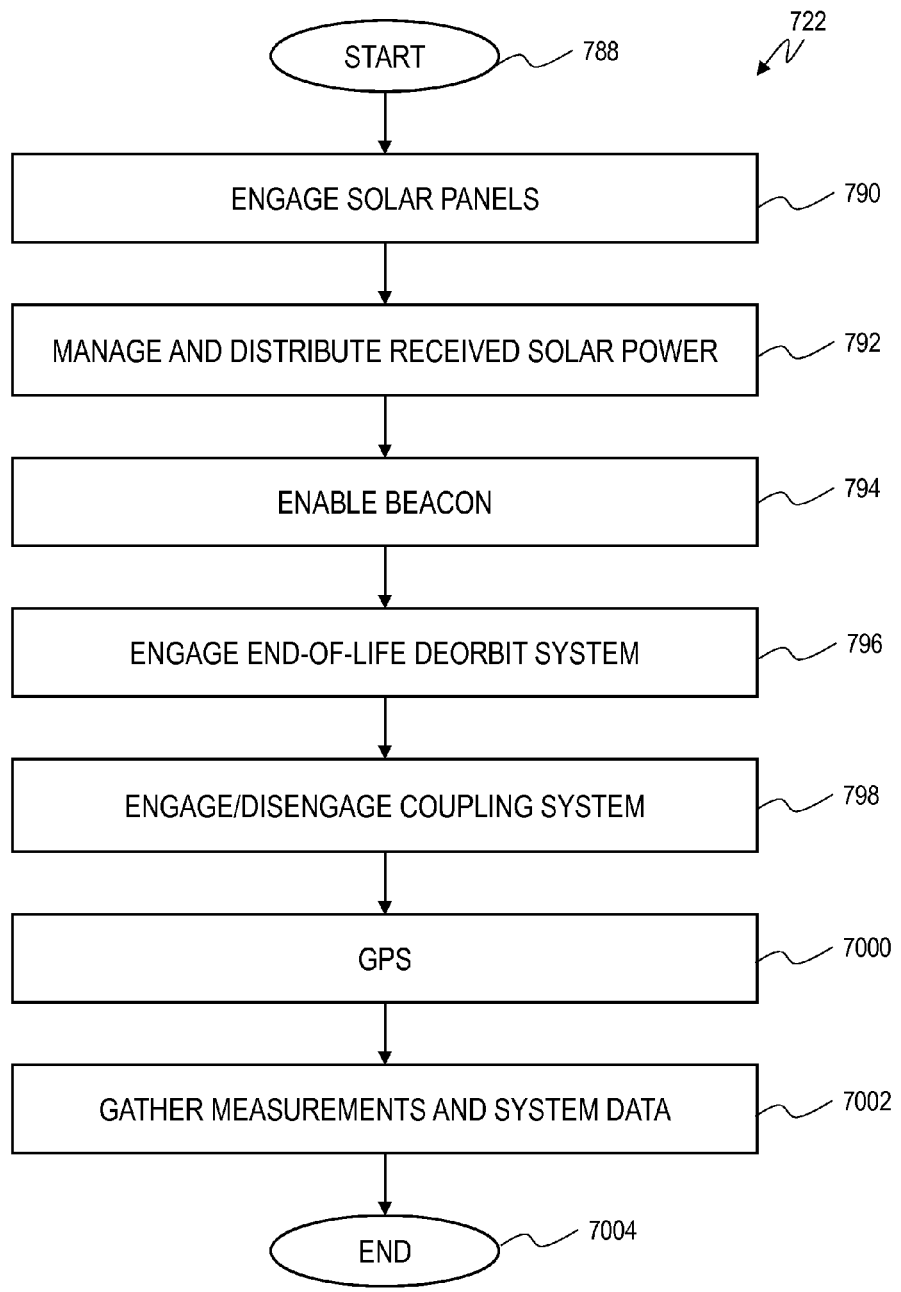
FIG. 16F is a flow chart of a sixth portion of the method for navigational and positional control of a satellite of FIGS. 16A, 16B, 16C, 16D, and 16E.

Referring now to FIG. 16F, a sixth portion of the exemplary method 700 for navigational and positional control of a satellite is illustrated with a flow chart. In particular an embodiment of step 722, an exemplary method of engaging the satellite 106 is illustrated. The method begins at step 788. In response to the steps in the control loop and method 700, the controller 402 may send command signals to initiate various functions of the satellite 106, depending on the situation. The controller 402 may send signals to engage the solar panels 202 such that they begin to produce DC current (step 790). The controller 402, through the power distribution module 248 may manage and distribute the power produced by the solar panels 202 (step 792). The controller 402 may enable the beacon (step 794). The controller 402 may through the de-orbiter module 244 engage the end-of-life deorbit system (step 796). The controller 402 may through the coupling module 336 engage or disengage the coupling system 300 (step 798). The controller 402 may send messages to, and receive messages from, the GPS satellite 108 to verify position determinations (step 7000). The controller 402 may gather additional measurements and system data (step 7002). The method ends at step 7004.

Figure 17A:
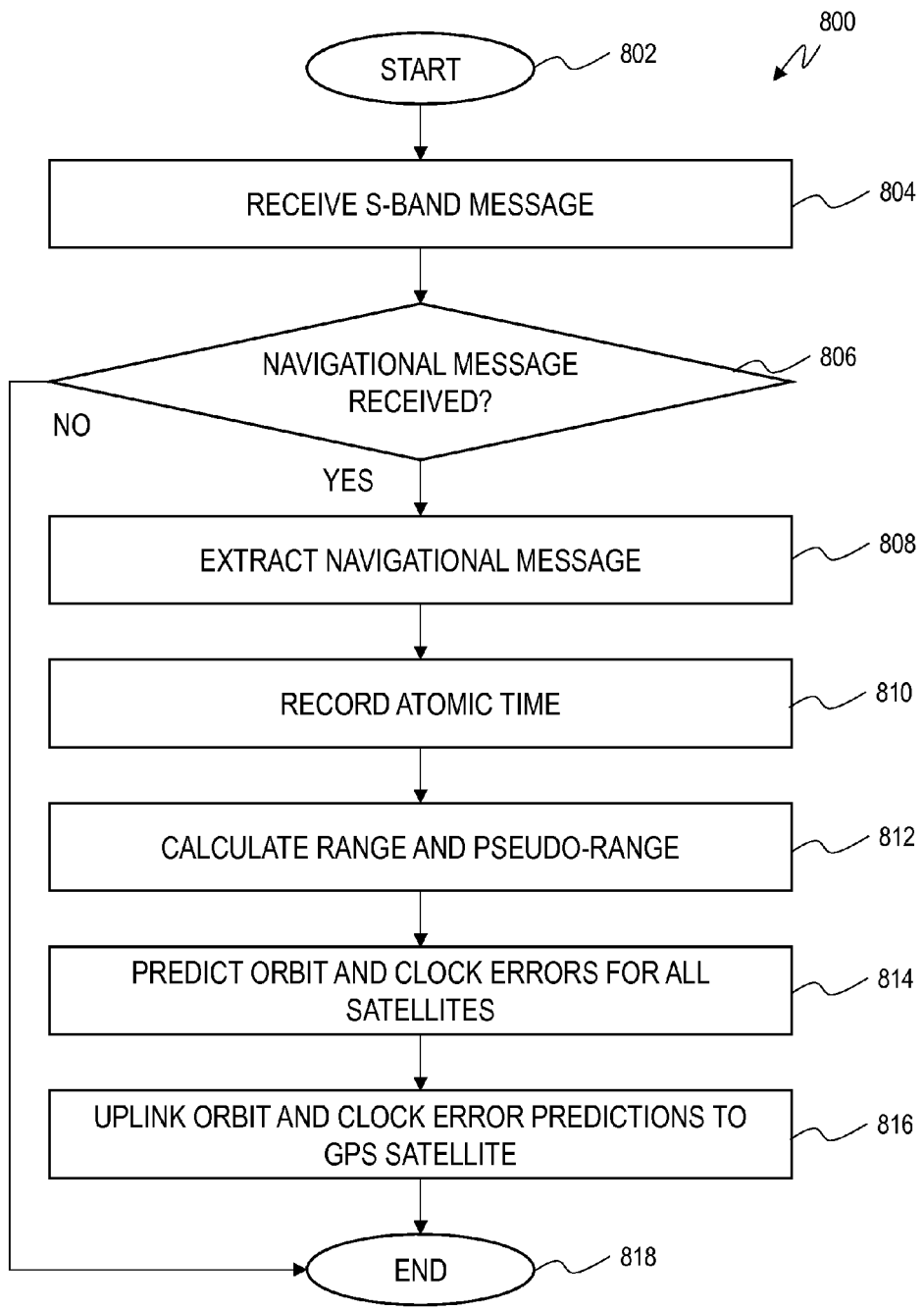
FIG. 17A is a flow chart of a first portion of a method for communication between earth stations and satellites according to an exemplary embodiment of the invention.

Referring now to FIG. 17A, a first portion of an exemplary method 800 for communication between earth stations and satellites is illustrated with a flow chart. The method 800 begins at 802. The command station 114 may receive different types of messages from one or more of the satellites 106. The messages may be received with the receiver 144, and may include, for example, a message transmitted in an S-band frequency (step 804). The computer 136 may determine what type of message has been received, and in response to the determination take different steps. Navigational messages are one type of message the receiver 144 may receive. Navigational messages may relate to the position and/or orbit of the satellites 106, and may aid the command station 114 in transmitting navigational commands. The computer 136 may determine if a message received is a navigational message (step 806). If the message is not a navigational message, the first portion of method 800 may end (step 818).

If the computer 136 determines that the message received is a navigational message, the computer 136 may decrypt the message (step 808), and record the atomic time sent attached to the message, and the atomic time the message was received (step 810). The computer 136 may calculate the range, and the pseudo-range of the satellite 106. Calculating ranges and pseudo-ranges for satellites from position messages sent from the satellite to the earth is known in the art (step 812). The computer 136 may predict errors in the positions reported by all the satellites 106, and errors in the atomic times reported by all satellites, at least in part, in response to the calculated ranges and pseudo-ranges (step 814). The command station 114 may transmit to the GPS satellite 108 position and clock error predictions, for transmission and correction, to the satellites 106 (step 816). The first portion of the method 800 ends at step 818.

Figure 17B:
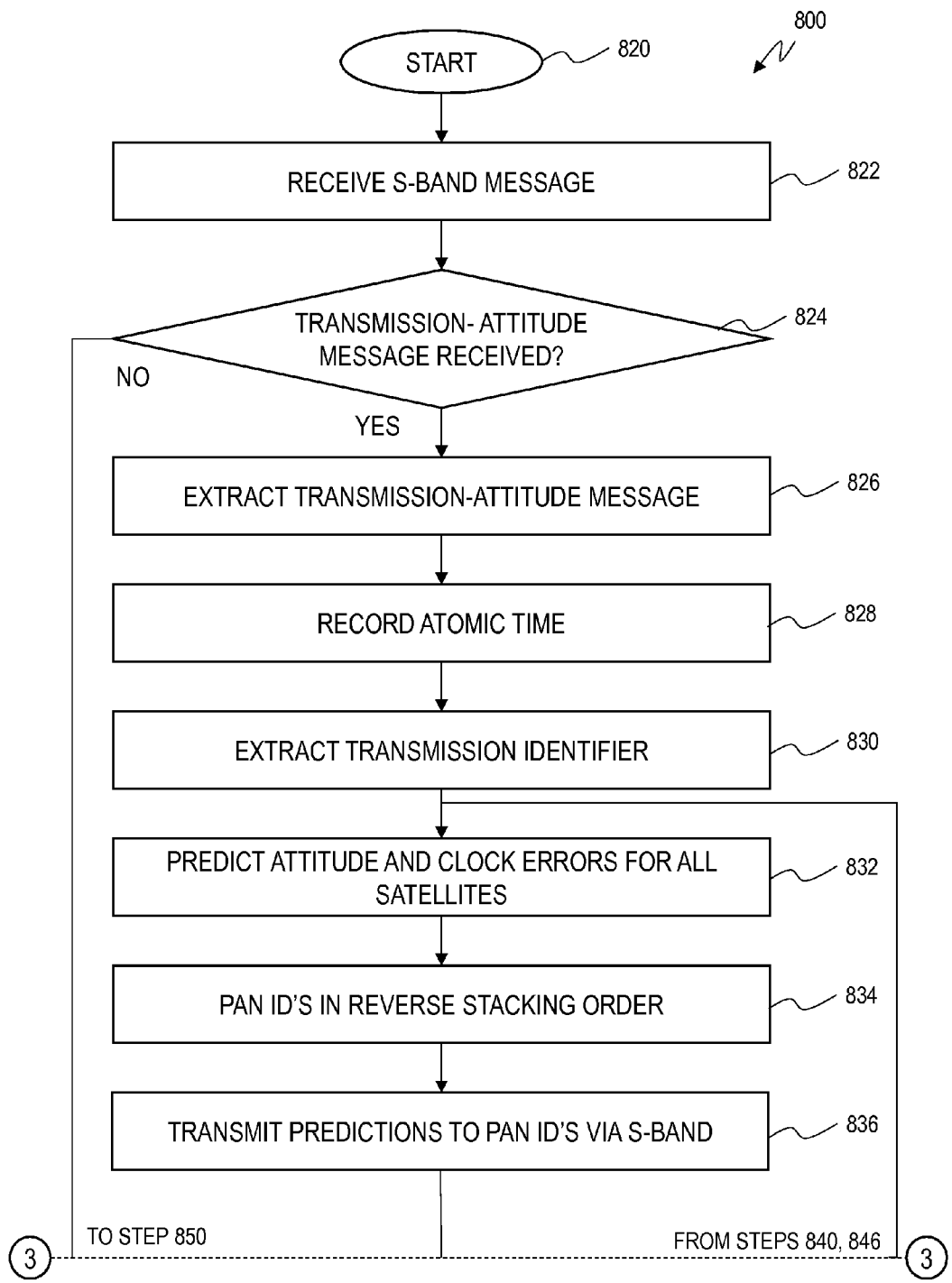
FIG. 17B is a flow chart of a second portion of the method for communication between earth stations and satellites of FIG. 17A.

Referring now to FIG. 17B, a second portion of the exemplary method 800 for communication between earth stations and satellites is illustrated with a flow chart. The command station 114 may also receive attitude related messages from one or more of the satellites 106. The messages may be received with the receiver 144, and may include, for example, a message transmitted in an S-band frequency (step 822). Attitude messages may relate to the attitude and/or orientation of the satellites 106, and may aid the command station 114 and pilot command station 116 in sending the pilot signals such that the satellites 106 may target the rectenna 118 with the microwave energy 110. Attitude messages may also aid the command station 114 in generating command to the satellites 106 to change or maintain their orientation. The computer 136 may determine if a message received is an attitude message (step 824). If the message is not an attitude message, the method 800 may proceed to step 850 (FIG. 17C) and end.

If the message is an attitude message, the computer 136 may decrypt the message (step 826), and record the satellite 106 attitude, the atomic time sent attached to the message, and the atomic time the message was received (step 828). The computer 136 may also determine an identifier which identifies which satellite 106 in the array 220 sent the message. In one embodiment, where the radio 240 is a 6LoWPAN, the identifier may be a personal area network identifier, or a PAN ID (step 830). The computer 136 may predict attitude and clock errors for all satellites 106, at least in part, in response to one or more of the satellite 106 attitudes, the atomic times the attitude messages were sent, and the atomic time the messages were received (step 832).

The computer 136 may store the predicted attitude and clock errors in a packet with and by identifier of the satellite 106 for which they are predicted. These packets may be stored in an order which corresponds with, and provides efficient communication with the communication architecture of the array 220. For example, the predicted attitude and clock errors for each single satellite 106 may be stored in a packet with the satellite's 106 PAN ID. Multiple packets may be stored in reverse stacking order by PAN ID (step 834). The predicted attitude and clock errors for one or more of the satellites 106 may then be transmitted to a single satellite 106, multiple satellites 106, or an array 220 in accordance with the communication architecture of the array 220 (step 836). The method 800 may continue to steps in FIG. 17C.

Figure 17C:
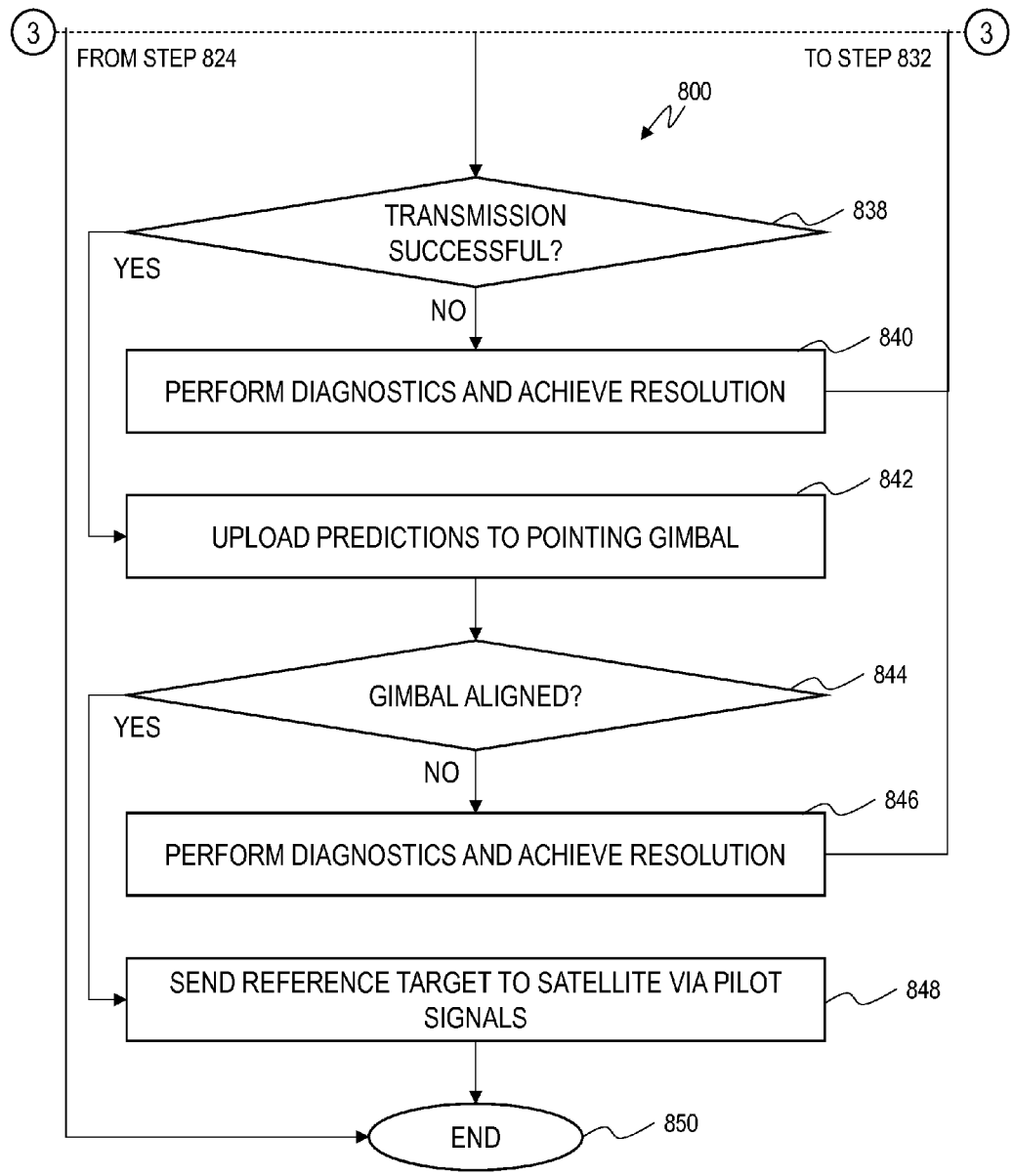
FIG. 17C is a flow chart of a third portion of the method for communication between earth stations and satellites of FIGS. 17A and 17B.

Referring now to FIG. 17C, a third portion of the exemplary method 800 for communication between earth stations and satellites is illustrated with a flow chart. When the command station 114 transmits a message containing predicted attitude and clock errors, the satellites 106 receiving the transmission may confirm receipt of the message (838). If the command station 114 does not receive a confirmation that the message was received, the computer 136 may perform diagnostics and other steps to achieve a resolution (step 840). The method 800 then returns to step 832 in FIG. 17B. If the command station 114 receives a confirmation, the command station 114 may send the predicted correct attitudes of the satellites 106 to the pilot command station 116 so that the pilot signals may be sent correctly (step 842). In one embodiment, the pilot command station 116 may align the antenna 121 with the predicted satellite attitudes by moving the pointing gimbal 119. The pilot command station 116 may determine if the antenna 121 is in a position to send the pilot signals correctly (step 844). If the pilot command station 116 determines that the antenna 121 is not in a position to send the pilot signals out correctly, diagnostics and other steps to achieve a resolution (step 846). The method 800 then returns to step 832 in FIG. 17B. If the, pilot command station 116 determines the antenna 121 is in a position to send the pilot signals out correctly, the pilot signals are sent and the reference target is sent to the satellite 106 through the pilot signals. The DIAL 238 may determine the target, at least in part, in response to the pilot signals (846). The method ends at 850.

Figure 18A:
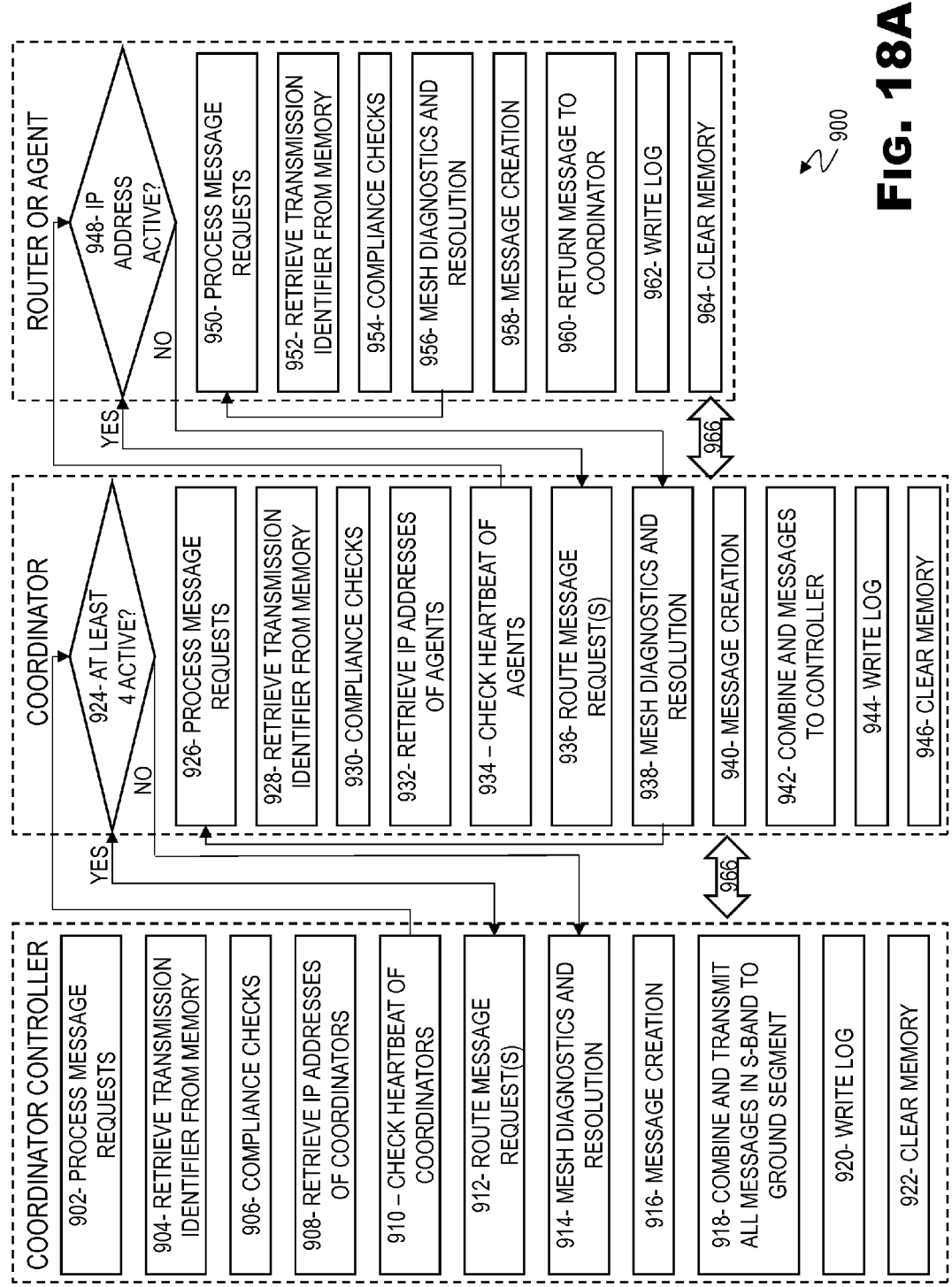
FIG. 18A is a schematic and flow chart of a first portion of a method for communication between satellites in a modular satellite array according to an exemplary embodiment of the invention.

Referring now to FIG. 18A, a first portion of an exemplary method 900 for communication between satellites in a modular satellite array is illustrated in a flow chart. Messages between the command station 114 and the GPS satellite 108, and the array 220 may be handled in accordance with the communication architecture of the array. The method 900 shown and described is an exemplary method for use with the exemplary communication architecture shown and described in relation to FIG. 6. The coordinator controller 284 may process message requests from the command station 114 and/or the GPS satellite 108. There are many messages being transmitted between the earth and satellites in space which the receiver 414 may receive. Not all of the messages are for any of the satellites 106 in the array 220. The coordinator controller may identify and may decrypt messages which are designated for the satellites 106 in the array 220 (step 902). A more detailed description of this step is shown and described in relation to FIG. 18D. The coordinator controller 284 may retrieve information from the memory component 406 to identify the satellite 106 to which a message is intended for (step 904). The coordinator controller 284 may do compliance checks on the message as known in the art (step 906). The coordinator controller 284 may retrieve the IP address of the coordinators 286 for which the message(s) is intended, and retrieve other necessary information from the memory component 406 for processing the messages (step 908). The coordinator controller 284 may do a handshake with each of the coordinators 286, and ensure that a predetermined minimum number are active. In one embodiment the minimum number may be four (4) (step 910, 924). If the predetermined number of coordinator 286 are active, the coordinator controller 284 may route messages for each coordinator 286 and their router/agents 288 to each coordinator 286, and receive messages from all coordinators 286 and their router/agents 288 for transmission to the command station 114 or the GPS satellite 108 (912). The coordinator controller 284, the coordinators 286, and the router/agents 288 may exchange messages through local area network (LAN) communication links 966. If the minimum number of coordinators 286 are not active, the coordinator controller 284 may take diagnostic and resolution steps to ensure the communication architecture of the array 220 is functional.

The coordinator controller 284 may create messages for the command station 114, and/or the GPS satellite (step 916). A more detailed method for this step is shown and described in relation to FIGS. 18B and 18C. The coordinator controller 284 may combine and transmit all messages from itself, the coordinators 286, and the router/agents 288 to the command station 114 and/or the GPS satellite (step 918). The coordinator controller 284 may write a log of messages received and sent to the memory component 406 (step 920). The coordinator controller 284 may clear the memory component 406 of the messages (step 922).

Each coordinator 286 may receive messages from the coordinator controller 284 after the handshake with the coordinator controller 284. Each coordinator 286 may process message requests as further shown and described in relation to FIG. 18D (step 926). Each coordinator 286 may identify the router/agent 288 for which each message is intended, do compliance checks on the messages, retrieve the IP addresses for those router/agents 288, and retrieve other necessary information from the memory component 406 for processing the messages (steps 928, 930, 932). The coordinator 286 may do a handshake with each router/agent 288 beneath that coordinator 286 to ensure that each router/agent 288 is active (steps 934, 948). If a router agent 288 is active the coordinator 286 may send messages intended for the router/agent 288 (step 936). If a router/agent 288 is not active, the coordinator 286 may take steps for diagnosis and resolution (step 938). The coordinator 286 may create messages for the command station 114, and/or the GPS satellite (step 940). A more detailed method for this step is shown and described in relation to FIGS. 18B and 18C. The coordinator 286 may combine and transmit all messages from itself, and the router/agents 288 underneath that coordinator 286 to the coordinator controller 284 (step 942). The coordinator 286 may write a log of messages received and sent to the memory component 406 (step 944). The controller 284 may clear the memory component 406 of the messages (step 946).

Each router/agent 288 may receive messages from the coordinator 286 after the handshake with the coordinator 286. Each router/agent 288 may process message requests as further shown and described in relation to FIG. 18D (step 950). Each router/agent 288 may do compliance checks on the messages, and retrieve identifiers and other necessary information from the memory component 406 for processing the messages (steps 952, 954). If the router/agent 288 finds any problems in the messages, the router/agent 288 may take steps for diagnosis and resolution (step 956). The router/agent 288 may create messages for the command station 114, and/or the GPS satellite (step 958). A more detailed method for this step is shown and described in relation to FIGS. 18B and 18C. The router/agent 288 may transmit the messages to the coordinator 286 (step 960). The router/agent 288 may write a log of messages received and sent to the memory component 406 (step 962). The router/agent 288 may clear the memory component 406 of the messages (step 964).

Figure 18B:
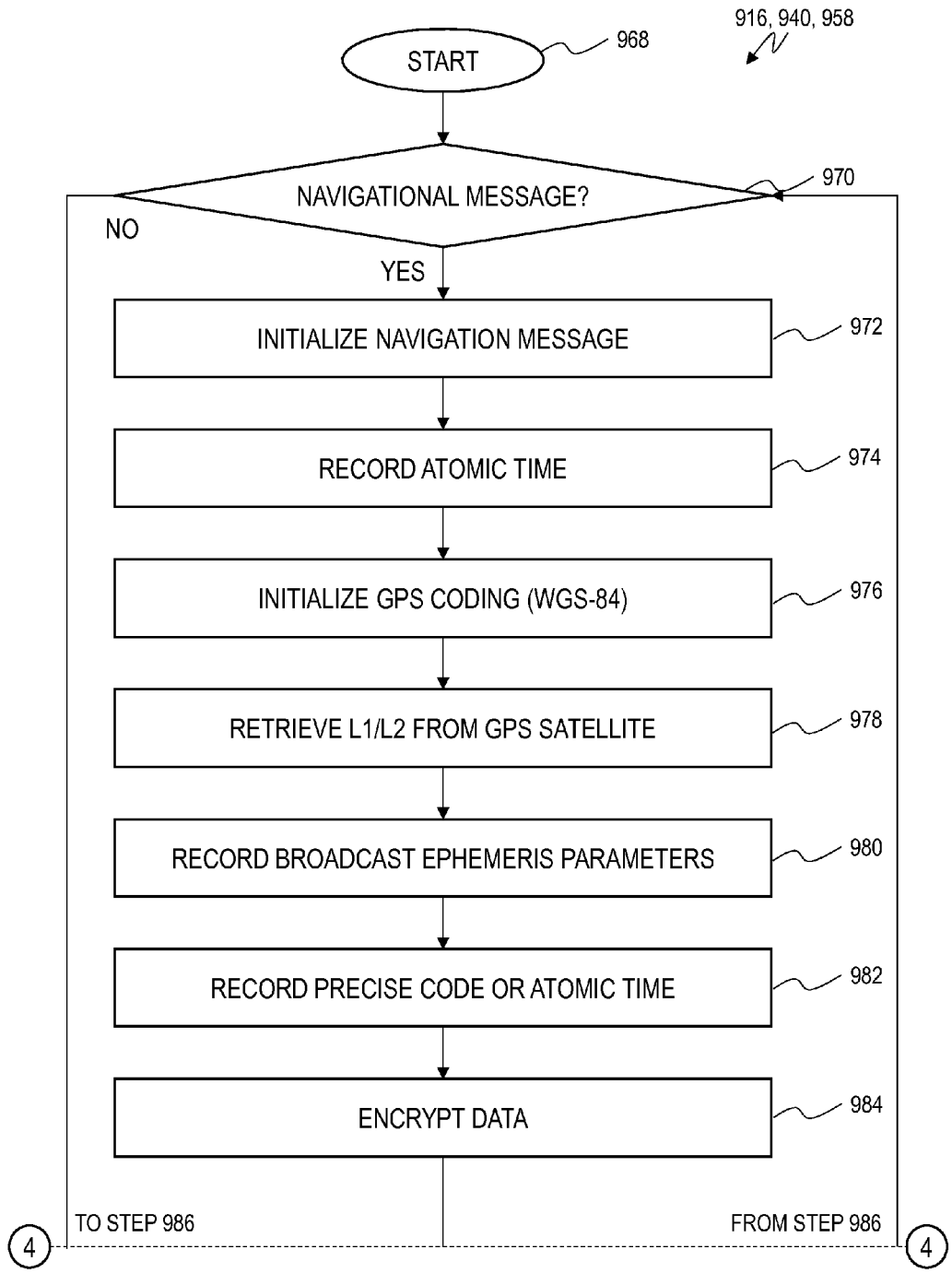
FIG. 18B is a flow chart of a second portion of the method for communication between satellites in a modular satellite array of FIG. 18A.

Referring now to FIG. 18B, a second portion of exemplary method 900 for communication between satellites in a modular satellite is illustrated in a flow chart. Particularly, a first portion of an exemplary method of performing the message creation step 916, 940, and/or 958 illustrated in FIG. 18A is illustrated in a flow chart. The method starts at 968. Each of the satellites 106 in the array 220 may create navigational messages which may inform the command station 114 and/or the GPS satellite 108 of information indicative of their position and/or orbit. The satellites 1106 may also create messages which may inform the command station 114 and/or the GPS satellite 108 of information indicative of their attitude and/or orientation. If the message is not a navigational message the method may proceed to step 986 illustrated in FIG. 18C. If the message is a navigational message the controller 402 may initialize the navigation message (steps 970, 972). The controller 402 may record the atomic time (step 974).

The controller 402 may initialize coding for the World Geodetic System 84 (WGS-84), a standard for use in cartography, geodesy, and navigation including by GPS. The WGS-84 may comprise a standard coordinate system for the Earth, a standard spheroidal reference surface (the datum or reference ellipsoid) for raw altitude data, and a gravitational equipotential surface (the geoid) that defines the nominal sea level. In other embodiments, other standards as known in the art, or developed or updated, may be used (step 976). The controller 402 may retrieve L1 and L2 signals from the GPS satellite (step 978). The controller 402 may record the broadcast ephemeris parameters along with the precise code or atomic time (steps 980, 982). The controller 402 may encrypt the data (step 984). The method 900 may continue to steps in FIG. 18C.

Figure 18C:
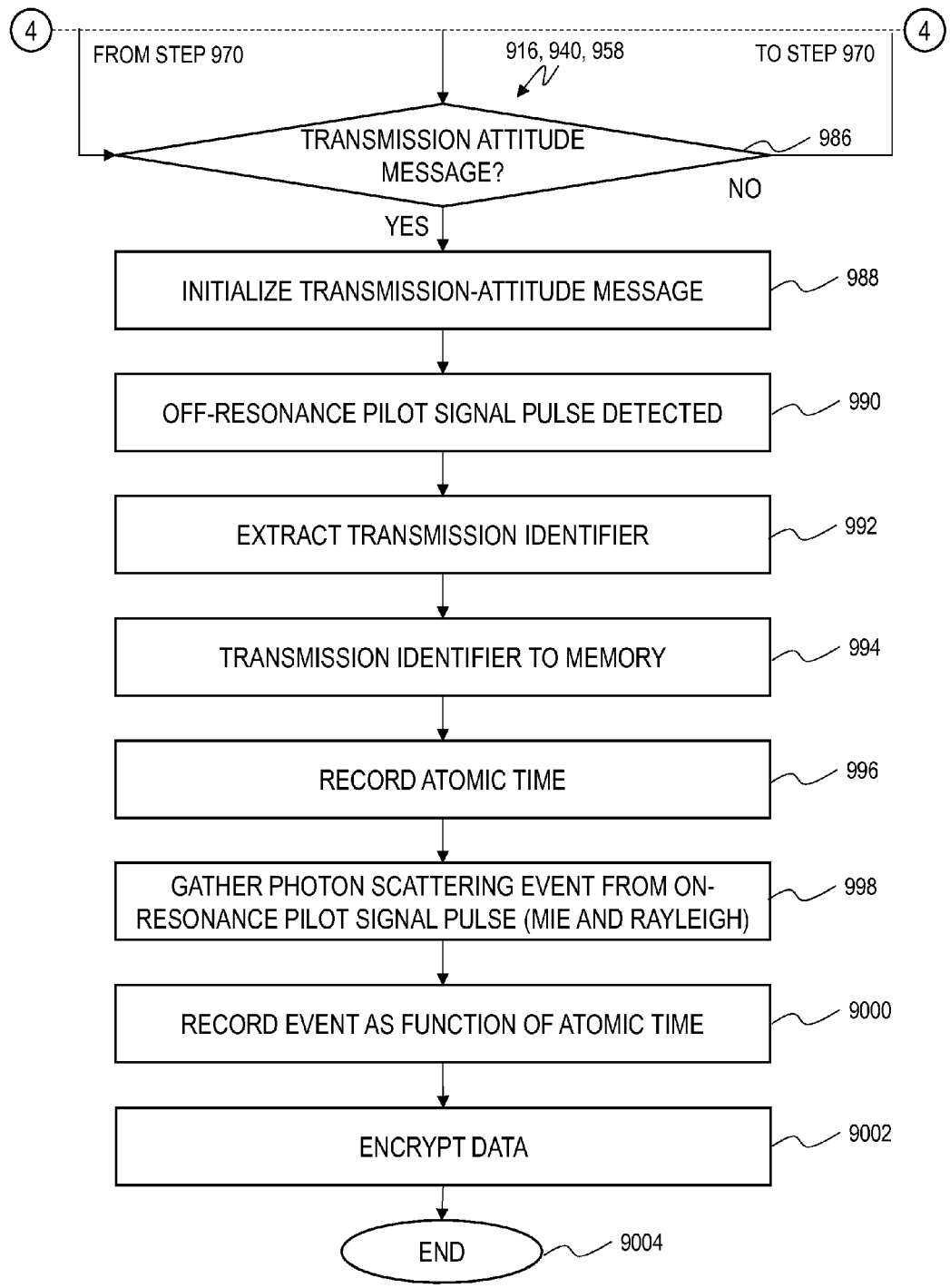
FIG. 18C is a flow chart of a third portion of the method for communication between satellites in a modular satellite array of FIGS. 18A and 18B.

Referring now to FIG. 18C, a third portion of the method 900 for communication between satellites is illustrated in a flow chart. Particularly, a second portion of the exemplary method of performing the message creation step 916, 940, and/or 958 illustrated in FIG. 18A is illustrated. If the message is an attitude message, the controller 402 may initialize the message (steps 986, 988). The pilot command station 116 may send two pilot signals. The first pilot signal may be a signal at a frequency which interacts locally to the wave guide antenna 282 surface. The second pilot signals may be a signal at a frequency which will not interact locally to the wave guide antenna 282. The DIAL 238 may determine the location of the rectenna 118, at least in part, as a result of a detected interaction of the first signal locally to the wave guide 204; and a determined difference between the interaction of the first pilot signal locally to the wave guide, and the non-interaction of the second pilot signal locally to the wave guide 204. In general, the more interaction between the first pilot signal locally to the wave guide, the higher the density of an interaction cloud will be, and the more aligned the wave guide antenna 282 is with the rectenna 118. Measuring the difference between pilot signals by DIAL is known in the art. Targeting through measuring with DIAL locally to a surface is an exemplary embodiment of the invention. The controller 402 may record the second pilot signal at time intervals, and extract and save to the memory component 406 the transmissions identifier, as well as the atomic time (steps 992, 994, 996). The controller 402 may also record the interaction between the first pilot signal and the wave guide 404 at time intervals, and save the information and the atomic time to the memory component 406 (steps 998, 9000). The controller 402 may periodically retrieve the information on the first and second pilot signals, and encrypt the data (step 9002). The method ends at step 9004.

Figure 18D:
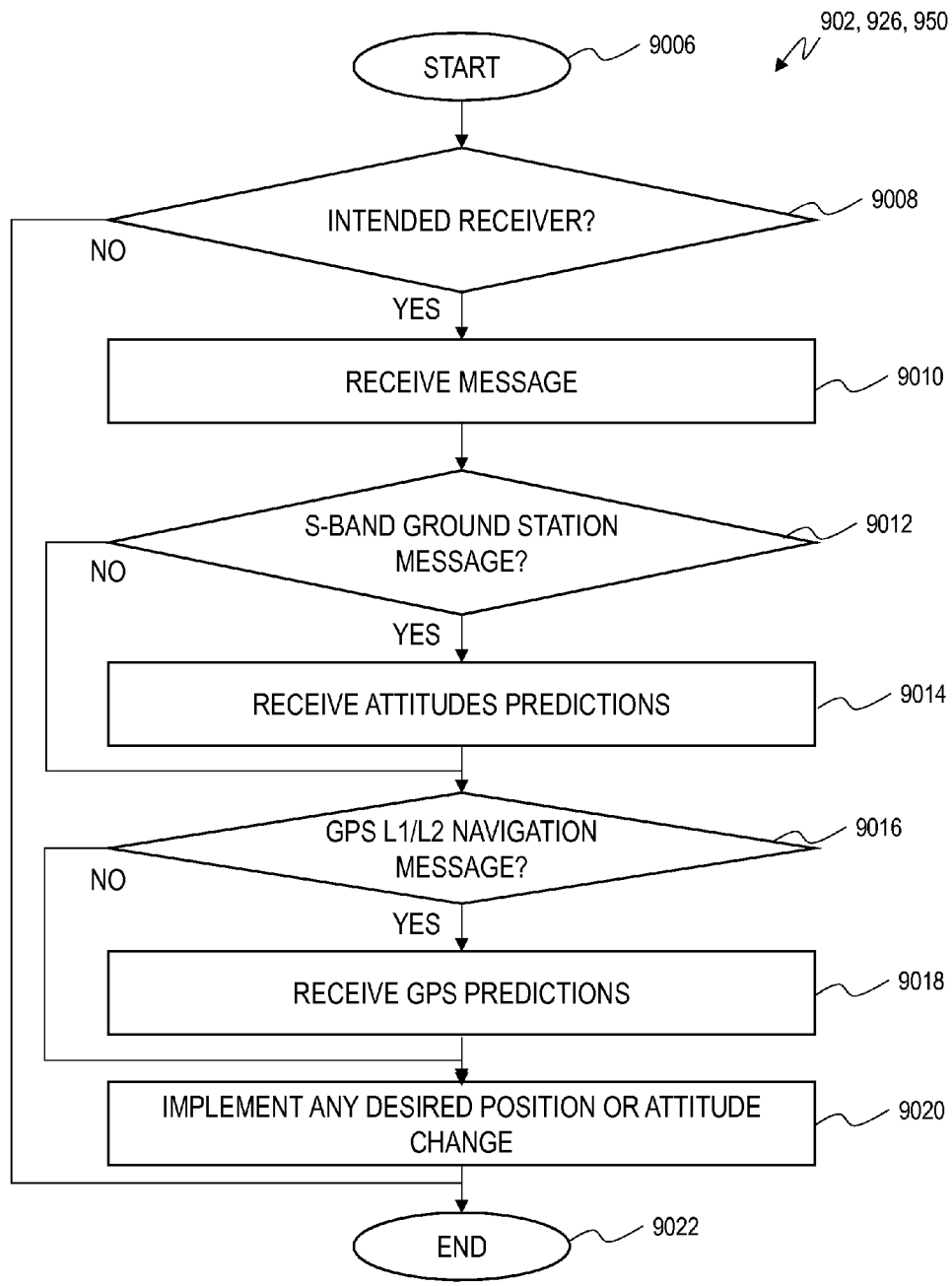
FIG. 18D is a flow chart of a fourth portion of the method for communication between satellites in a modular satellite array of FIGS. 18A, 18B, and 18C.

Referring now to FIG. 18D, a fourth portion of the method 900 for communication between satellites is illustrated in a flow chart. Particularly, an exemplary method of performing the process message requests step 902, 926, and/or 950 illustrated in FIG. 18A is illustrated. The message starts at step 9006. When a message is received by a satellite 106 through the PAN, the satellite 106 must determine whether the message is intended for itself, or another satellite 106. The message may have an identifier, such as, for example, an IP address. If the identifier corresponds to that satellite 106's identifier then the message may be for that satellite 106. If the message is not for that satellite 106, then the message ends at step 9022. If it is for that satellite, the satellite may receive the message (steps 9008, 9010). The satellite 106 may determine if the message is a message from the command station 114, and if so receive attitude predictions from the command station 114. If not, the method may proceed to step 9016 (steps 9012, 9014). The satellite 106 may determine if the message is a L1 and/or L2 message from the GPS satellite 108 (step 9016). If not, the method may proceed to step 9020. If so, the satellite 106 may receive the GPS predictions (step 9018). The satellite 106 may implement any desired position or attitude change desired in response to the message (step 9020). The method may end at 9022.

It should be understood, of course, that the foregoing relates to exemplary embodiments of the invention and that modifications may be made without departing from the spirit and scope of the invention as set forth in the following claims

What is claimed is:

1. A modular satellite for converting solar energy to microwave energy and transmitting the microwave energy to the earth to be converted into electricity, comprising:
   a frame;
   solar panels configured to convert solar energy into direct current, and connected to the frame;
   a magnetron operatively connected to the solar panels to receive the direct current and configured to convert the direct current into microwave energy, and at least partially enclosed by the frame;
   a planar wave guide antenna operatively connected to the magnetron to receive the microwave energy and direct the microwave energy to a station on earth, and connected to the frame; and
   a coupling system for coupling the frame with the frame of another satellite to form an array in response to at least one of locking, unlocking, and navigational commands; and
   wherein the satellite has a mass equal to or less than four kilograms, and a volume equal to or less than three liters.

2. The satellite of claim 1, further including a controller configured to determine the location of a rectenna on earth, for transmitting microwave energy to at least in part in response to a determined difference between the interaction of a first pilot signal, transmitted from the rectenna location, locally to the wave guide antenna, and the non-interaction of a second pilot signal, transmitted from the rectenna location, locally to the wave guide antenna.

3. The satellite of claim 2, wherein the first pilot signal includes a signal at a frequency which interacts locally to a surface of the wave guide antenna.

4. The satellite of claim 2, wherein the second pilot signals includes a signal at a frequency which does not interact locally to a surface of the wave guide antenna.

5. The satellite of 1, wherein the microwave energy has a frequency in the range of fourteen and seven tenths gigahertz to eighteen and seven tenths gigahertz.

6. The satellite of claim 1, wherein the satellite comprises a three unit cubesat, the three unit cubesat including three one unit cubesats fixedly connected.

7. The satellite of claim 1, wherein the frame includes elongated members fixedly connected to form a rectangular shape, and where the solar panels are connected to the frame to form a first side of the rectangular shape, and the planar wave guide antenna is connected to the frame to form a second side of the rectangular shape, the second side opposite the first side.

8. A satellite array for converting solar energy to microwave energy and transmitting the microwave energy to the earth to be converted into electricity, comprising:
multiple satellites coupled together, each satellite including:
one or more solar panels configured to convert solar energy into direct current;
a magnetron operatively connected to the solar panels to receive the direct current and configured to convert the direct current into microwave energy; and
one or more wave guides operatively connected to the magnetron to receive the microwave energy and direct the microwave energy to a station on earth; and
wherein the satellites are all coupled such that the solar panels of each satellite face the sun, and the wave guides face the earth, and
wherein the array generates and transmits to earth microwave energy with a frequency in the range of fourteen and seven tenths gigahertz to eighteen and seven tenths gigahertz.

9. The satellite array of claim 8, wherein each satellite has a mass less than four kilograms.

10. The satellite array of claim 8, wherein the satellites are coupled together with a coupling system including first polarity magnetic strips or elements attracted to second polarity magnetic strips or elements.

11. The satellite array of claim 8, wherein the satellites are coupled together with a coupling system including pins moveable between a first default position and a second position.

12. The satellite array of claim 8, wherein the satellites are communicatively connected through a local area network with a communication architecture including at least one coordinator controller, multiple coordinators, and multiple router/agents.

13. The satellite array of claim 12, wherein the at least one coordinator controller sends and receives messages from a ground command station designated for, and created by, the coordinators and router/agents.

14. The satellite array of claim 8, wherein each satellite includes a 6LoWPAN receiver and transmitter for communicating with the other satellites in the array.

15. A method for converting solar energy to microwave energy with an array of satellites; the array of satellites including multiple satellites; each satellite including at least one solar panel, wave guide, and magnetron; each satellite having a mass equal to or less than four kilograms; and transmitting the microwave energy to the earth to be converted into electricity, comprising:
transporting each of the satellites in the array to a space station with a cargo load for the space station;
launching each of the satellites into a geo-stationary low earth orbit between fifty-two degree latitude north and fifty-two degree latitude south from the space station;
coupling all the satellites together in an array wherein the solar panels of each satellite face the sun, and the wave guides face the earth;
converting solar energy into direct current with the solar panel of at least one satellite;
converting the direct current into microwave energy with the magnetron of at least one satellite, the microwave energy having a frequency in the range of fourteen and seven tenths gigahertz to eighteen and seven tenths gigahertz;
transmitting the microwave energy to a station on earth with the wave guide of at least one satellite; and
converting the microwave energy into one of alternating current or direct current to power a consumer load on earth.

16. The method of claim 15, wherein the microwave energy is transmitted to a rectenna located at a pilot command station.

17. The method of claim 16, wherein the pilot command station includes a pointing gimbal for moving an antenna, and wherein the method further includes sending a first pilot signal, and a second pilot signal to at least one of the satellites for targeting the rectenna with the microwave energy.

18. The method of claim 15, wherein the satellites are coupled together while they are in the geo-stationary low-earth-orbit.

19. The method of claim 18, wherein the satellites are coupled together, at least in part, in response to navigational and coupling signals generated by a ground command station on earth.

* * * * *